(12) United States Patent
Spindler et al.

(10) Patent No.: US 6,569,910 B1
(45) Date of Patent: May 27, 2003

(54) ION EXCHANGE RESINS AND METHODS OF MAKING THE SAME

(75) Inventors: Ralph Spindler, Lake Zurich, IL (US); Thomas W. Beihoffer, Arlington Heights, IL (US); Michael M. Azad, Mt. Prospect, IL (US); Constance M. Noe, Mt. Prospect, IL (US)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/569,315

(22) Filed: May 11, 2000

Related U.S. Application Data

(60) Provisional application No. 60/161,628, filed on Oct. 27, 1999.

(51) Int. Cl.[7] .................. C08F 220/06; B01J 39/04
(52) U.S. Cl. ..................... 521/30; 521/31; 521/32; 521/33; 521/34; 521/36
(58) Field of Search .................. 521/30, 31, 32, 521/33, 34, 36

(56) References Cited

U.S. PATENT DOCUMENTS

| | | | |
|---|---|---|---|
| 2,783,212 A | 2/1957 | Schnell | |
| 3,957,698 A | 5/1976 | Hatch | |
| 4,076,917 A | 2/1978 | Swift et al. ................... 526/49 |
| 4,191,814 A * | 3/1980 | Amick .......................... 521/32 |
| 4,224,415 A | 9/1980 | Meitzner et al. .............. 521/38 |
| 4,263,407 A | 4/1981 | Reed, Jr. ...................... 521/33 |
| 4,427,793 A * | 1/1984 | Reed ............................ 521/32 |
| 4,224,415 A | 7/1993 | Meitzner et al. .............. 521/38 |
| 5,599,335 A | 2/1997 | Goldman et al. ........... 604/368 |
| 5,616,622 A * | 4/1997 | Harris ........................ 521/28 |
| 5,669,894 A | 9/1997 | Goldman et al. ........... 604/368 |
| 5,962,578 A | 10/1999 | Beihoffer et al. ........... 524/521 |

FOREIGN PATENT DOCUMENTS

| | | |
|---|---|---|
| AU | 509755 | 5/1980 |
| EP | 0 228 831 | 7/1987 |
| EP | 0 550 747 | 7/1993 |
| EP | 0 585 898 | 3/1994 |
| GB | 894392 | 4/1958 |
| GB | 1 440 582 | 6/1976 |
| GB | 1 602 063 | 4/1981 |
| WO | WO 89/08718 | 9/1989 |
| WO | WO 94/09043 | 4/1994 |
| WO | WO 97/29048 | 8/1997 |
| WO | WO 99/40990 | 8/1999 |

OTHER PUBLICATIONS

Kunin, The synthesis of ion exchange resins, *Ion Exchange Resins*, pp. 73–87 (1990).
Encyclopedia of Chemical Technology, Fourth Edition, ed. M. Howe–Grant, pp.737–783 (1995).

* cited by examiner

*Primary Examiner*—Fred Zitomer
(74) *Attorney, Agent, or Firm*—Marshall, Gerstein & Borun

(57) ABSTRACT

Ion exchange resin granules containing a crosslinked polymerized α,β-unsaturated acid, like acrylic acid, or a vinyl monomer containing an amino group, like polyvinylamine, and methods of manufacturing the resin, are disclosed.

22 Claims, 5 Drawing Sheets ions and hydroxide ions diminishes. Eventually, the resin becomes exhausted and
ION EXCHANGE RESINS AND METHODS OF MAKING THE SAME

CROSS REFERENCE TO RELATED APPLICATION

This application claims the benefit of U.S. provisional patent application Ser. No. 60/161,628, filed Oct. 27, 1999.

FIELD OF THE INVENTION

The present invention generally relates to ion exchange resins comprising granules of a crosslinked polymer comprising an $\alpha,\beta$-unsaturated acid, like poly(acrylic acid), or a vinyl monomer containing an amino group, like poly (vinylamine). The ion exchange resins can be used, for example, in the purification of water, sugar refining, recovery of transition metals, recovery of proteins from fermentation broths and agricultural by-products, and in pharmaceutical separations technology.

BACKGROUND OF THE INVENTION

Ion exchange generally is defined as a reversible chemical interaction between a solid and a fluid, wherein selected ions are interchanged between the solid and fluid. An exemplary ion exchange process includes a cation exchange process wherein a fluid passes through a bed of porous resin beads having charged mobile cations, such as hydrogen or hydroxide ions, which are available for exchange with metal ions or anions present in the fluid. The ion exchange resin readily exchanges hydrogen ions for the metal ions, or hydroxide ions for other anions, present in the fluid as the fluid passes through the bed.

In time, the number of hydrogen or hydroxide ions available for exchange with metal ions or other anions diminishes. Eventually, the resin becomes exhausted and cannot perform any further ion exchange (i.e., all available exchange sites are occupied). However, the resin can be regenerated. Regeneration is accomplished using a regenerant solution, which, in the case of a cation exchange resin, comprises an acid, i.e., a large excess of hydrogen ions, that is passed over the ion exchange beads and drives the collected ions from the resin, thereby converting the ion exchange resin back to its original form.

A specific example of a cation exchange process is the purification/softening of tap water. In this process, weak acid ion exchange resins use carboxyl radicals, in the sodium form, as the cation exchange site. The sodium ions are the charged mobile cations. Alkaline earth metals, such as calcium and magnesium, present in the tap water are exchanged for the sodium cations of the resin as the water passes through a bed of the ion exchange resin beads. Removal of calcium and magnesium ions from water in exchange for sodium ions via weak acid cation exchange resins is not limited to the water purification/softening applications, but also includes the softening of fluids, such as clay suspensions, sugar syrups, and blood, thereby rendering the fluids more amenable to further processing. When the exchange capabilities of the ion exchange resin are exhausted, a weak acid can be used to regenerate the acid form of the resin, followed by conversion of the acid form of the resin to the sodium form with dilute sodium hydroxide.

Similarly, an anion exchange resin containing anionic radicals removes anions, like nitrate and sulfate, from solution. Anion exchange resins also can be regenerated with a sodium hydroxide solution, for example.

The reversibility of the ion exchange process permits repeated and extended use of an ion exchange resin before replacement of the resin is necessary. The useful life of an ion exchange resin is related to several factors including, but not limited to, the amount of swelling and shrinkage experienced during the ion exchange and regeneration processes, and the amount of oxidizers present in a fluid passed through the resin bed.

Cation exchange resins typically are highly crosslinked polymers containing carboxylic, phenolic, phosphonic, and/or sulfonic groups, and roughly an equivalent amount of mobile exchangeable cations. Anion exchange resins are similar but contain amino groups and roughly an equivalent amount of mobile exchangeable anions. Suitable ion exchange resins, preferably, (a) possess a sufficient degree of crosslinking to render the resin insoluble and low swelling; (b) possess sufficient hydrophilicity to permit diffusion of ions throughout its structure; (c) contain sufficient accessible mobile cation or anion exchange groups; (d) are chemically stable and resist degradation during normal use; and (e) are more dense than water when swollen.

Hatch U.S. Pat. No. 3,957,698 discloses production of weak acid ion exchange resins by the copolymerization of methacrylic or acrylic acid, in a low molecular weight hydrocarbon diluent, with 0.5 to 10 wt. % of divinylbenzene, based on the weight of initial monomers, to achieve the proper degree of crosslinking. In order to prepare high purity ion exchange resins by this process, the resin is heated at a high temperature or is extensively washed with a solvent to remove the diluent. The resin particles are in the size range of 2 to 5 microns.

Meitzner et al. U.S. Pat. No. 4,224,415 discloses the preparation of ion exchange particles prepared by suspension copolymerization of water-insoluble monomers, such as methyl acrylate and methyl methacrylate, with a crosslinking agent such as divinylbenzene. In addition, a precipitant is added to the monomer phase to impart a reticular nature to the resulting particles. This process requires that the divinylbenzene content be in the range from 8 to 25 wt. %. These particles must be hydrolyzed with a strong base in order to prepare a resin with exchangeable functionalities.

Therefore, conventional weak acid cation exchange resins typically are produced using a multi-step process. The first step is a batch, aqueous suspension polymerization of methyl acrylate monomer, in the presence of divinylbenzene, to provide crosslinked beads of methyl acrylate. The poly(methyl acrylate) beads then are reacted with sodium hydroxide to hydrolyze the ester groups of the poly(methyl acrylate), and thereby introduce carboxylate (i.e., weak acid) functionality into the beads. Due to solubility of acrylic acid in the aqueous phase of the suspension polymerization, acrylic acid is not wholly substituted for the methyl acrylate monomer in the foregoing process. Therefore, conventional manufacturing processes preferably utilize methyl acrylate, which is a relatively expensive monomer, in the syntheses of the ion exchange resin. Acrylic acid, however, can be copolymerized in a batch process with methyl acrylate monomer utilizing a divinylbenzene crosslinker.

In view of the foregoing, it would be desirable to provide an ion exchange resin, either cation or anion, produced from less expensive monomers such as, for example, acrylic acid. Furthermore, it would be desirable to provide an ion exchange resin that can be manufactured in a simple, continuous process, and that exhibits the excellent ion exchange properties and physical properties of prior ion exchange resins, or improves upon these properties. Additionally, it would be desirable to minimize the amount of organic solvents used in the preparation of an ion exchange resin.

SUMMARY OF THE INVENTION

The present invention is directed to ion exchange resins comprising a polymerized and crosslinked $\alpha,\beta$-unsaturated acid, or a polymerized and crosslinked vinyl monomer containing an amino group, and to methods of manufacturing the same. More particularly, the present invention is directed to ion exchange resin granules comprising a crosslinked polymer or copolymer comprising an $\alpha,\beta$-unsaturated acid, like acrylic acid, or a vinyl monomer containing an amino group, like vinyl amine, that preferably have a highly crosslinked surface.

One aspect of the present invention, therefore, is to provide an ion exchange resin comprising a dry, granulated, polymerization product comprising: (a) an $\alpha,\beta$-unsaturated acid monomer, or a vinyl monomer containing an amino group, or salt thereof, (b) optional vinyl monomers, (c) a bulk crosslinking agent, and (d) a latent crosslinking agent and/or a surface crosslinking agent. In preferred embodiments, the granulated polymerization product is crosslinked with a latent and a surface crosslinking agent. In most preferred embodiments, the polymerization product contains a latent crosslinking agent.

The bulk crosslinking agent, which provides internal crosslinks between the polymer chains, has at least two polymerizable carbon—carbon double bonds. The latent crosslinking agent, which also provides internal crosslinks through the pendant acid or amino groups of a polymer includes (a) compounds having at least one polymerizable double bond and at least one functional group reactive with an acid or an amino group, like a carboxylic acid group, (b) compounds having at least two functional groups reactive with acid or amino groups, (c) polyvalent metal compounds capable of forming ionic crosslinks with acid groups, and (d) mixtures thereof. The surface crosslinking agent typically is a diglycidyl ether, a polyhydroxy compound, a hydroxyalkylamide, an alkylene carbonate, or a mixture thereof.

Another aspect of the present invention is to provide a method, preferably a continuous method, of manufacturing an ion exchange resin that includes the steps of polymerizing an aqueous solution comprising an $\alpha,\beta$-unsaturated acid, like acrylic acid, or a vinyl monomer containing an amino group, like vinyl amine, or a salt thereof, optional vinyl monomers, a bulk crosslinking agent, and optionally a latent crosslinking agent to form a hydrogel of the polymerized monomer. Optionally, subsequent processing steps can be used to add a latent crosslinking agent. The resulting hydrogel then is dried, cured, and sized to provide dried granules, followed by optionally crosslinking surfaces of the granules with a surface crosslinking agent to form the ion exchange resin. In each case, the ion exchange granules contain a bulk crosslinking agent, and a latent crosslinking agent and/or a surface crosslinking agent, in a total amount of crosslinking agents such that the granules absorb less than about 25 times, and preferably less than about 15 times, their weight in tap water under no load (i.e., AUNL), and resist swelling to a sufficient degree to perform as an ion exchange resin.

Yet another aspect of the present invention is to provide a method of manufacturing, either batchwise or continuously, an ion exchange resin comprising polymerizing one or more monounsaturated acid monomers, like acrylic acid, one or more vinyl monomers containing an amino group, like vinyl amine, or salts thereof, and optional vinyl monomers, in the presence of about 0.01 to about 3 mole %, based on the total number of moles of the monomers, of a polyvinyl bulk crosslinking agent, to provide a bulk crosslinked polymer hydrogel, followed by the addition of about 0 to about 6 mole %, based on the total number of moles of the monomers, of a latent crosslinker to further crosslink the bulk crosslinked hydrogel, then heating the hydrogel-latent crosslinking agent mixture at a sufficient temperature for a sufficient time to dry and cure the hydrogel and to form crosslinks through pendant acid or amino groups present on the polymer chains, thereby generating ion exchange resin particles. Optionally, the ion exchange resin particles then can be surface crosslinked with 0 to about 2 weight % of a surface crosslinking agent, based on the weight of the particles.

Alternatively, the latent crosslinking agent is added to the mixture of monomers and polyvinyl bulk crosslinking agent. The latent crosslinking agent does not react during the polymerization reaction, but is available for subsequent reaction with pendant acid or amino groups on the polymer during a heating step.

The step of surface crosslinking can be achieved by coating surfaces of the ion exchange granules with a solution containing a surface crosslinking agent, and then heating the coated granules at a sufficient temperature and for a sufficient time to dry and cure the granules and provide surface crosslinks. In an embodiment wherein a latent crosslinking agent is omitted, a surface crosslinking agent is required to provide the degree of crosslinking needed for an ion exchange resin. Similarly, if a surface crosslinking agent is omitted in an embodiment, a latent crosslinking agent is required to provide sufficient crosslinking for an ion exchange resin. A bulk crosslinking agent is utilized in all embodiments of the ion exchange resin of the present invention.

A present ion exchange resin is in the form of irregular granules, as opposed to spheres. The granular form of the ion exchange resin provides a greater surface area than spheres, thereby providing a more efficient ion exchange. In some embodiments, the present ion exchange resin granules generally have a relatively "soft" interior, i.e., the degree of internal crosslinking (i.e., bulk plus latent crosslinking) is sufficient to resist granule swelling and to allow percolation of a liquid through the particles. The granules, however, typically have a relatively "hard" surface, i.e., the degree of surface of surface crosslinking is high, i.e., at least 1000 ppm, and preferably about 1000 to about 20,000 ppm, to impart structural integrity to the granules and to further prevent swelling of the granules during use.

Further aspects and advantages of the invention will become apparent from the following detailed description of the preferred embodiments of the invention, taken in conjunction with the examples and the appended claims.

DETAILED DESCRIPTION OF THE PREFERRED EMBODIMENT

Figure 1:
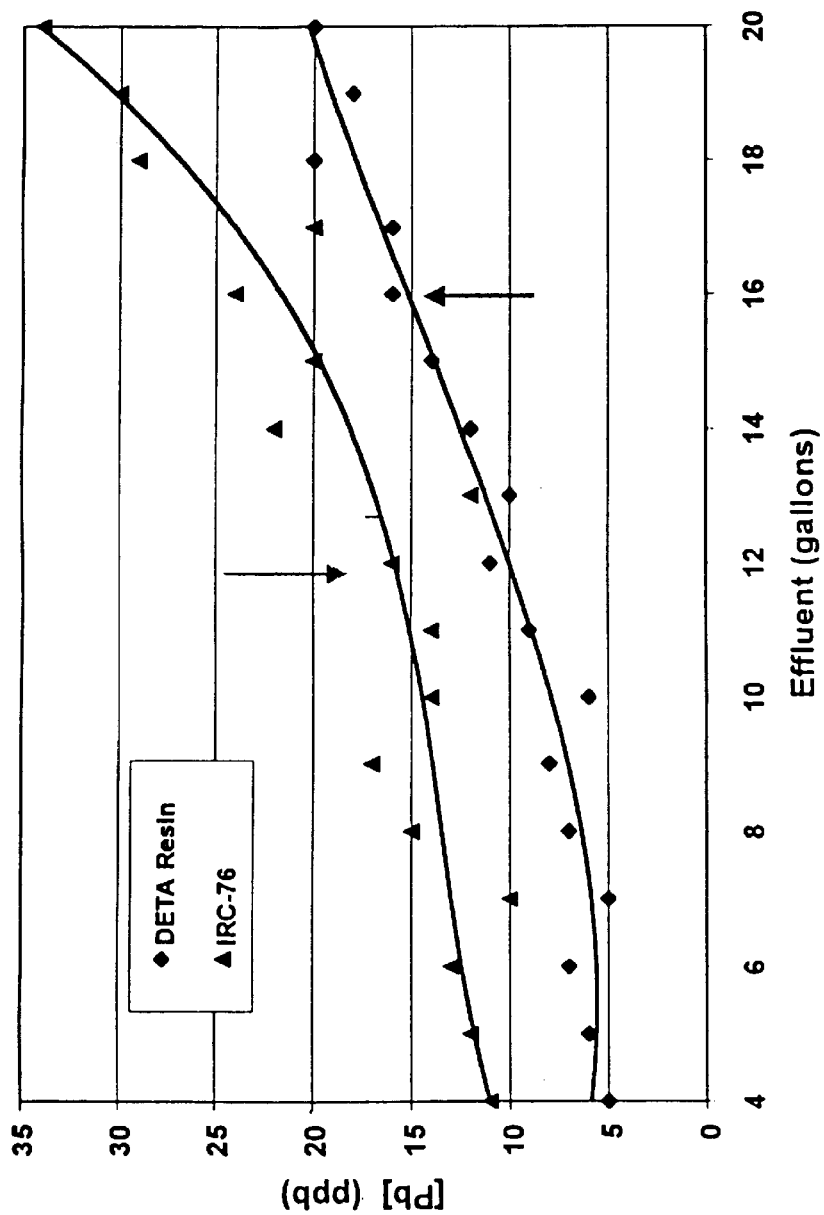
FIG. 1 contains plots of lead concentration (Pb) in parts per billion (ppb) vs. effluent in gallons comparing the lead-removal ability of an ion exchange resin of the present invention and a commercial control ion exchange resin.

The present invention is directed to granules of an ion exchange resin comprising a crosslinked polymer comprising an $\alpha,\beta$-unsaturated acid or a vinyl monomer containing an amino group, wherein the granules contain latent and/or surface crosslinks in addition to bulk crosslinks. The resin is prepared by a method, preferably a continuous method, comprising the steps of polymerizing, in aqueous solution, a monomer mixture comprising an $\alpha,\beta$-unsaturated acid, or a vinyl monomer containing an amino group, or salts thereof, optional vinyl monomers, and a bulk crosslinking agent to form a hydrogel. A latent crosslinking agent can be present in the monomer mixture or can be added to the hydrogel. The hydrogel, and latent crosslinker, if present, then is dried, cured, and sized to form dried granules containing bulk and, optionally, latent crosslinks. In some cases, the surfaces of the granules are surface crosslinked with at least about 1000 ppm of a surface crosslinking agent to provide an ion exchange resin. Surface crosslinking can be omitted if a latent crosslinking agent is used to provide latent crosslinks. Preferred embodiments of a present ion exchange resin incorporate a latent crosslinking agent and a surface crosslinking agent.

In one embodiment, a latent crosslinking agent is added to the monomer mixture. The latent crosslinking agent is not involved in the bulk polymerization reaction, but is dispersed in the polymer hydrogel. In another embodiment, the latent crosslinking agent is added to, and homogeneously dispersed in, the polymer hydrogel after the bulk polymerization reaction.

In either embodiment, heating the hydrogel, in the presence of the latent crosslinking agent, for a sufficient time at a sufficient temperature, forms latent crosslinks by reacting with pendant acid or amino groups present on the polymer chains. After latent crosslinking, the resulting ion exchange resin granules optionally can be surface crosslinked. Surface crosslinking can be accomplished, for example, by coating surfaces of the granules with the surface crosslinking agent, and then heating the coated granules at a sufficient temperature for a sufficient time to result in a cured, dry ion exchange resin.

An ion exchange resin of the present invention is a dry, granulated polymerization product of a monomer mixture comprising an $\alpha,\beta$-unsaturated acid monomer, or a vinyl monomer containing an amino group, or salts thereof, optional vinyl monomers, and a bulk crosslinking agent. The ion exchange resin granules further have incorporated therein a latent crosslinking agent and/or a surface crosslinking agent.

The bulk crosslinking agent comprises a compound having at least two polymerizable carbon—carbon double bonds and is incorporated into the polymer chains. A latent crosslinking agent comprises (a) a compound having at least one polymerizable double bond and at least one functional group reactive with an acid or an amino group, (b) a compound having at least two functional groups reactive with an acid or an amino group, (c) a polyvalent metal compound capable of forming ionic crosslinks with an acid group, and (d) mixtures thereof. The latent crosslinking agent crosslinks polymer chains through the pendant acid or amino groups. The surface crosslinking agent typically is a difunctional compound, like a diglycidyl ether, glycerol, a glycol or polyol, a hydroxyalkylamide, an alkylene carbonate, or a mixture thereof.

Granules of an ion exchange resin of the present invention have a sufficient degree of bulk crosslinking, and of latent and/or surface crosslinking, to resist appreciable swelling in the presence of aqueous media. Preferred ion exchange resin granules of the present invention have a relatively low degree of bulk crosslinking. This is in contrast to present day ion exchange resins that rely upon a high degree of bulk crosslinking to impart structural integrity to the ion exchange particle and to limit swelling of the ion exchange particle during hydration. This function is performed by the latent and/or surface crosslinking agent present in the ion exchange granules of the present invention. The present ion exchange resins are similar in chemical identity to superabsorbent polymers, but have a sufficiently high degree of latent and/or surface crosslinking such that the present ion exchange resins cannot absorb large amounts of fluids, and do not swell like a typical superabsorbent polymer.

Superabsorbent polymers (SAPs) are discussed generally in Goldman et al. U.S. Pat. Nos. 5,669,894 and 5,559,335. As used herein, the term "SAP" refers to superabsorbent polymer particles in the dry state, more specifically, particles containing from no water up to an amount of water less than the weight of the particles. SAPs can differ in their chemical identity, but all SAPs are capable of absorbing and retaining amounts of aqueous fluids equivalent to many times (i.e., at least 10 and up to a hundred times) their own weight, even under moderate pressure. The ability to absorb aqueous fluids under a confining pressure and form a hydrogel is an important requirement for an SAP. The term "hydrogel" refers to polymer particles in the hydrated state, and more specifically, to particles that have absorbed at least their weight in water, and typically several times their weight in water. This property is important because an SAP is used in, for example, sanitary and hygienic articles, wiping cloths, water-retaining agents, dehydrating agents, disposable towels and bath mats, disposable door mats, and disposable litter mats for pets. The ability to retain several times its weight in water, and thereby swell to form a hydrogel, is not desirable for an ion exchange resin, and is avoided because excessive swelling of an ion exchange resin retards or prohibits flow of a fluid through a bed of ion exchange resin granules.

As noted above, an ion exchange resin of the present invention comprises a polymerization reaction product of a monomer mixture comprising an $\alpha,\beta$-unsaturated acid, like acrylic acid (i.e., $CH_2$=$CHCO_2H$), or a monomer containing an amino group, like vinylamine or a precursor thereof, optional vinyl monomers, and a bulk crosslinking agent. The term "$\alpha,\beta$-unsaturated carboxylic acid" is defined as one or more $\alpha,\beta$-unsaturated carboxylic acids, salts of $\alpha,\beta$-unsaturated carboxylic acids, and partially neutralized $\alpha,\beta$-unsaturated carboxylic acids (i.e., DN (degree of neutralization) greater than zero and less than 100). The term "$\alpha,\beta$-unsaturated acid" also encompasses vinyl monomers having sulfonate, sulfate, phosphate, or phosphonate groups. The term "monomer containing an amino group" is defined as a repeating unit in a polymer having a pendant amino group. The term "bulk crosslinking agent" is defined as a polyvinyl monomer capable of copolymerizing with the α,β-unsaturated acid, or the monomer containing an amino group, via reaction of unsaturated carbon—carbon bonds.

The polymerization reaction product is subjected to further crosslinking utilizing a latent crosslinking agent and/or a surface crosslinking agent. As used herein, a "latent crosslinking agent" is a compound having functionality capable of reacting with the pendant acid or amino groups present on the polymerization reaction product. The latent crosslinking agent is added to the monomer mixture or to the reaction product hydrogel, and forms internal crosslinks throughout the granule (by reaction with the pendant acid or amino groups) when the hydrogel is dried to form the ion exchange granules.

As used herein, a "surface crosslinking agent" also is a compound having functionality capable of reacting with pendant acid or amino groups. The "surface crosslinking agent" is applied to the surface of the ion exchange granules, and is reacted to form additional crosslinks at the surfaces of the ion exchange granules.

The remainder of the specification is particularly directed to an ion exchange resin based on acrylic acid. However, other α,β-unsaturated acids and vinyl monomers containing an amino group can be used in an ion exchange resin of the present invention. Ion exchange resins prepared by the present methods exhibit improved ion exchange properties regardless of the identity of the α,β-unsaturated acid or vinyl monomers containing an amino group used to prepare the ion exchange resin.

The ionic exchange resins typically are prepared by first polymerizing a monomer containing an acyl or other acid moiety, e.g., acrylic acid or a salt thereof, a monomer containing an amino group, or a moiety capable of providing an acid or amino group, i.e., acrylonitrile or N-vinylformamide, in the presence of a bulk crosslinking agent, i.e., a polyfunctional organic compound. The ion exchange resin can contain other copolymerizable units, i.e., other monoethylenically unsaturated comonomers, well known in the art (like styrene), as long as the polymer is substantially, i.e., at least 50%, and preferably at least 65%, acid or amino monomer units. To achieve the full advantage of the present invention, the ion exchange resin contains at least 75%, and more preferably, at least 85%, and up to 100%, acid or amino monomer units. The ion exchange resin can be neutralized from 0 to 100 mole % with a base or an acid, like sodium hydroxide or hydrochloric acid, to provide a neutralized ion exchange resin.

The present ion exchange resins have pendant carboxyl or amino groups present along the polymer chain. Polymers containing such pendant carboxyl or amino groups are synthesized either from monomers previously substituted with one or more acid or amino groups or by incorporating acid or amino groups into the polymer after synthesis. To incorporate carboxyl or amino groups into a polymer, any of a number of ethylenically unsaturated acids or amino-containing monomers can be homopolymerized or copolymerized. Carboxyl or amino groups also can be incorporated into the polymer chain indirectly by hydrolyzing homopolymers and copolymers of monomers such as N-vinylformamide, N-vinylacetamide, acrylamide, acrylonitrile, methacrylamide, and alkyl(meth)acrylates.

Therefore, the present invention is not limited to ion exchange resins based on acrylic acid, but extends to ion exchange resins that include, but are not limited to, methacrylic acid, ethacrylic acid, α-chloroacrylic acid, α-cyanoacrylic acid, β-methacrylic acid (crotonic acid), 2-methyl-2-butene dicarboxylic acid, α-phenylacrylic acid, β-acryloxypropionic acid, sorbic acid, α-chlorosorbic acid, angelic acid, cinnamic acid, p-chlorocinnamic acid, β-stearylacrylic acid, itaconic acid, citraconic acid, mesaconic acid, glutaconic acid, aconitric acid, maleic acid, fumaric acid, tricarboxyethylene, maleic anhydride, fumaric anhydride, itaconic anhydride, citraconic anhydride, mesaconic anhydride, methyl itaconic anhydride, ethyl maleic anhydride, diethyl maleate, methyl maleate, and other α,β-unsaturated carboxylic acids and anhydrides, salts thereof, partial salts thereof, and mixtures thereof. Acrylic acid, however, is the most preferred α,β-unsaturated carboxylic acid.

In addition, the α,β-unsaturated acid can be a monomer containing a sulfonate, sulfate, phosphate, or phosphonate group as the acid group. Sulfonate groups can be generated from monomers containing functional groups hydrolyzable to the sulfonic acid form, for example, alkenyl sulfonic acid compounds and sulfoalkylacrylate compounds. Ethylenically unsaturated sulfonic acid monomers include, for example, aliphatic or aromatic vinyl sulfonic acids, such as vinylsulfonic acid, allyl sulfonic acid, vinyl toluene sulfonic acid, styrene sulfonic acid, acrylic and methacrylic sulfonic acids, such as sulfoethyl acrylate, sulfoethyl methacrylate, sulfopropyl acrylate, 2-vinyl-4-ethyl-benzene, 2-allylbenzene sulfonic acid, 1-phenyl-ethylene sulfonic acid, sulfopropyl methacrylate, 2-hydroxy-3-methacryloxypropyl sulfonic acid, and 2-acrylamide-2-methylpropane sulfonic acid.

Sulfate groups are generated by reacting homopolymers or copolymers containing hydroxyl groups or residual ethylenic unsaturation with sulfuric acid or sulfur trioxide. Examples of such treated polymers include sulfated polyvinylalcohol, sulfated hydroxyethyl acrylate, and sulfated hydroxypropyl methacrylate. Phosphate groups are incorporated by copolymerizing ethylenically unsaturated monomers containing a phosphoric acid moiety, such as methyacryloxy ethyl phosphate, with the α,β-unsaturated carboxylic acid.

A present ion exchange resin therefore can be based on, for example, polyacrylic acid, hydrolyzed starch-acrylonitrile graft copolymers, starch-acrylic acid graft copolymers, hydrolyzed acrylonitrile polymers, hydrolyzed acrylamide copolymers, hydrolyzed ethylene-maleic anhydride copolymers, hydrolyzed isobutylene-maleic anhydride copolymers, and mixtures thereof.

An ion exchange resin of the present invention also extends to resins based on monomers having an amino group, such as a vinyl amine. The ion exchange resin can be any polymer containing a primary amine or a secondary amine functionality. The basic resin also can be a crosslinked polyethylenimine, a poly(allylamine), a poly(diallylamine), a copolymer of a dialkylamino acrylate and a monomer having primary amino, or secondary amino functionality, a guanidine-modified polystyrene, such as

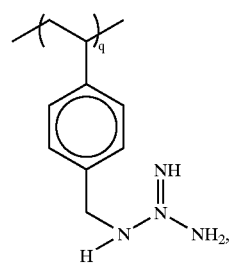

or a poly(vinylguanidine), i.e., poly(VG), a strong basic resin having the following structural formula

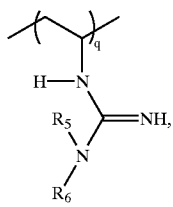

wherein q is a number from 10 to about 100,000, and $R_5$ and $R_6$, independently, are selected from the group consisting of hydrogen, $C_1$–$C_4$ alkyl, $C_3$–$C_6$ cycloalkyl, benzyl, phenyl, alkyl-substituted phenyl, naphthyl, and similar aliphatic and aromatic groups. The ion exchange resin also can contain other copolymerizable units and is crosslinked using a polyfunctional organic compound as the bulk crosslinking agent.

Optional copolymerizable vinyl monomers for introduction into the ion exchange resin include, but are not limited to, ethylene, propylene, isobutylene, $C_1$ to $C_4$ alkyl acrylates and methacrylates, vinyl acetate, methyl vinyl ether, and styrenic compounds having the formula:

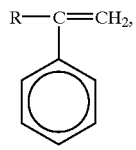

wherein R represents hydrogen or a $C_{1-6}$ alkyl group, and wherein the phenyl ring optionally is substituted with one to four $C_{1-4}$ alkyl or hydroxy groups. Such vinyl monomers are present in an amount of 0 to 50%, by weight, of the monomers present in the polymerizable monomer mixture.

Suitable $C_1$ to $C_4$ alkyl acrylates include, but are not limited to, methyl acrylate, ethyl acrylate, isopropyl acrylate, n-propyl acrylate, n-butyl acrylate, and the like, and mixtures thereof. Suitable $C_1$ to $C_4$ alkyl methacrylates include, but are not limited to, methyl methacrylate, ethyl methacrylate, isopropyl methacrylate, n-propylmethylmethacrylate, n-butyl methacrylate, and the like, and mixtures thereof or with $C_{1-4}$ alkyl acrylates. Suitable styrenic compounds include, but are not limited to, styrene, α-methylstyrene, p-methylstyrene, t-butyl styrene, and the like, and mixtures thereof or with $C_{1-4}$ alkyl acrylates and/or methacrylates.

Typically, the α,β-unsaturated acid or amino-containing monomer, or salts thereof, and any optional vinyl comonomers are present in the aqueous monomer mixture in an amount of at least about 25 wt. % to about 95 wt. %, based on the weight of the aqueous mixture. The bulk crosslinking agent is present in an amount of about 0.01 to about 3 mole % of bulk crosslinking agent per mole of monomers, and more preferably about 0.02 to about 2 mole % of bulk crosslinking agent per mole of monomers. Alternatively stated, a bulk crosslinking agent is present in the monomer mixture in an amount of less than about 7 wt. %, and typically about 0.1 to about 5 wt. %, based on the total weight of the monomers. Preferably, the bulk crosslinker is present in the monomer mixture in an amount of about 0.2 to about 3 wt. %, based on the total weight of the monomers.

The α,β-unsaturated carboxylic acid monomer or amino-containing monomer is bulk crosslinked during aqueous solution polymerization to a sufficient extent such that the resulting polymer is substantially water-insoluble, i.e., less than 3% by weight water soluble, but has an ability to absorb many times its weight in water to form a hydrogel. The reaction product, therefore, is insufficiently crosslinked during polymerization to perform as an ion exchange resin because the polymerization reaction product has the ability to absorb aqueous fluids and swell. Such properties are not desirable in ion exchange resins. The polymerization reaction product, therefore, has a crosslinking density of less than about 20%, typically less than about 15%, and often about 0.01% to about 10%.

Bulk crosslinking agents include compounds having at least two polymerizable carbon—carbon double bonds. Examples of bulk crosslinking agents are crosslinking polyvinyl monomers that include polyacrylic (or polymethacrylic) acid esters represented by the following formula (I); and bisacrylamides, represented by the following formula (II).

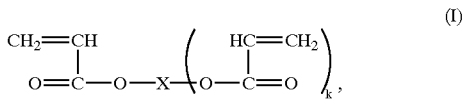
(I)

wherein X is ethylene, propylene, trimethylene, cyclohexyl, hexamethylene, 2-hydroxypropylene, —(CH₂CH₂O)ₙ CH₂CH₂—, or

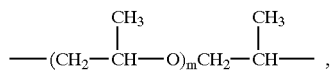

wherein n and m, independently, are an integer 5 to 40, and k is 1 or 2;

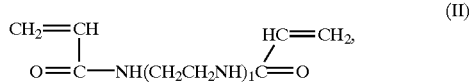
(II)

wherein l is 2 or 3.

The compounds of formula (I) are prepared by reacting polyols, such as ethylene glycol, propylene glycol, trimethylolpropane, 1,6-hexanediol, glycerin, pentaerythritol, polyethylene glycol, or polypropylene glycol, with acrylic acid or methacrylic acid. The compounds of formula (II) are obtained by reacting polyalkylenepolyamines, such as diethylenetriamine, tris(2-aminoethyl)amine, 1,3-diaminopropane, hexamethylenediamine, ethylenediamine, and triethylenetetramine, with acrylic acid.

Specific crosslinking monomers include, but are not limited to, 1,3-butylene glycol diacrylate, 1,3-butylene glycol dimethacrylate, 1,4-butanediol dimethacrylate, 1,4-butanediol diacrylate, 1,6-hexanediol dimethacrylate, 1,6-hexanediol diacrylate, cyclopentadiene diacrylate, diallyl succinate, diallyl maleate, diallyl esters of a polycarboxylic acid, diallyl fumarate, diethylene glycol diacrylate, diethylene glycol dimethacrylate, dipentaerythritol pentaacrylate, divinyl ethers of ethylene glycol, divinyl esters of a polycarboxylic acid, divinyl ether divinyl adipate, divinylbenzene, ethoxylated bisphenol-A dimethacrylate, ethoxylated bisphenol-A diacrylate, ethylene glycol diacrylate, ethylene glycol dimethacrylate, ethylene glycol digylcidyl ether (EGDGE), N,N'-methylenebisacrylamide (MBA), neopentyl glycol dimethacrylate, pentaerythritol triacrylate, pentaerythritol tetraacrylate, polyethylene glycol diacrylate, polyethylene glycol dimethacrylate, tetraallyl ammonium halides, tetraallyloxyethanetetraethylene glycol diacrylate, tetraethylene glycol dimethacrylate, triallylamine (TAA), triallyl terephthalate, triallyl pentaerythritol ether (TAPE), triethylene glycol dimethacrylate, triethylene glycol diacrylate, trimethylolpropane triacrylate (TMPTA), trimethylolpropane trimethacrylate, tripropylene glycol diacrylate, tris(2-hydroxyethyl)isocyanurate triacrylate, tris (2-hydroxyethyl)isocyanurate trimethacrylate, trivinyl trimellitate, and mixtures thereof. Compounds such as divinylbenzene and divinyl ether also can be used as crosslinkers. Especially preferred bulk crosslinking agents are N,N'-methylenebisacrylamide, N,N'-methylenebismethacrylamide, ethylene glycol dimethacrylate, and trimethylolpropane triacrylate.

Polymerization of the aqueous monomer mixture is achieved by bringing the mixture to a temperature of about −10° C. to about 100° C., preferably about 50° C. to about 80° C., and adding a polymerization initiator. The initiator can be a redox initiator, a thermal initiator, or a mixture thereof.

Examples of redox initiators include a reducing agent, such as a sulfite or bisulfite of an alkali metal, ammonium sulfite, ammonium metabisulfate, or ammonium bisulfite; an alkali metal persulfate or ammonium persulfate; t-butyl hydroperoxide; di-t-butyl hydroperoxide; t-butyl perbenzoate; t-butyl peroxy isopropyl carbonate; and peroxy-3,3,5 trimethylcyclohexane. Examples of suitable thermal initiators include azobisisobutyronitrile; 4-t-butylazo-4'-cyanovaleric acid; 4,4'-azobis(4-cyanovaleric acid); 2,2'-azobis(2-amidinopropane)dihydrochloride; 2,2'-azobis(2,4-dimethylvaleronitrile); dimethyl 2,2'-azobisisobutyrate; 2,2'-azodimethyl bis(2,4-dimethylvaleronitrile); (1-phenylethyl)azodiphenylmethane; 2,2'-azobis(2-methylbutyronitrile); 1,1'-azobis(1-cyclohexanecarbonitrile); 2-(carbamoylazo)-isobutyronitrile; 2,2'-azobis(2,4,4-trimethylpenta-2-phenylazo-2,4-dimethyl-4-methoxyvaleronitrile; 2,2'-azobis (2-methylpropane); 2,2'-azobis(N,N'-dimethyleneisobutyramidine)dihydrochloride; 4,4'azobis(4-cyanopentanoic acid); 2,2'-azobis(2-methyl-N-[1,1-bis(hydroxymethyl)-2-hydroxyethyl] propionamide); 2,2'-azobis(2-methyl-N-[1,1-bis(hydroxymethyl)ethyl] propionamide); 2,2'-azobis-[2-methyl-N(2-hydroxyethyl) propionamide]; 2,2'-azobis(isobutyramide)dihydrate, and the like.

These initiators, redox and thermal, can be used singly or in combination. Of these, especially preferred initiators are a redox initiator comprising ammonium persulfate and sodium hydrogen sulfite, and azo initiators, such as azobisisobutyronitrile or 2,2'-azobis(2-amidinopropane) dihydrochloride, commercially available under the tradename V-50 from Wako Chemicals U.S.A., Inc., Richmond, Va. The initiator is used in the form of an aqueous solution, but the initiator can be diluted with another suitable solvent. The initiator typically is used, for example, in an amount, calculated as solids, of about 0.1 wt. % to about 10 wt. %, based on the weight of the acrylic acid monomer, preferably about 0.5 wt. % to about 5 wt. %, based on the weight of the monomers. Depending on the amount and kind of the initiator, the initiator optionally can be used together with isopropyl alcohol, an alkyl mercaptan, or other chain transfer agent to control the molecular weight of the polymerization product.

Ultraviolet (UV) light also can be used to effect polymerization of the monomer mixture. UV light is used in conjunction with a redox initiator and/or a free radical initiator. In addition, when UV light is utilized, a photoinitiator is added to the reaction mixture. The photoinitiator is used in a standard amount well known to persons skilled in the art. Suitable photoinitiators include, but are not limited to, 2-hydroxy-1-[4-(hydroxyethyoxy)phenyl]-2-methyl-1-propanone, which is commercially available from Ciba Additives of Hawthorne, N.Y., as IRGACURE 2959, and 2-hydroxy-2-methyl-1-phenyl-1-propanone which also is commercially available from Ciba Additives as DAROCUR 1173.

Polymerization of the monomer solution proceeds rapidly to yield a highly viscous hydrogel that is extruded, typically, onto a flat surface such as a continuously moving conveyor belt.

The hydrogel, if not already neutralized, can be neutralized with sodium or potassium carbonate, for example, to provide an extrudate having a degree of neutralization (DN) of about 0% to about 100%, preferably 0% to about 85%, more preferably 0% to about 80%.

Optionally, prior to neutralization, the extruded hydrogel can be further crosslinked by a latent crosslinking agent. In particular, in some cases, it is desirable to provide a polymerized reaction product (i.e., the hydrogel) having a low crosslink density. Such hydrogels are easy to handle, for example, are easily extruded. However, the water-insoluble polymer present in the hydrogel does not contain a sufficient crosslink density to provide polymer granules useful as an ion exchange resin. For example, granules resulting from the lightly crosslinked polymerized reaction product absorb many times their weight in water and swell. Such granules are not useful as an ion exchange resin because aqueous fluids are not able to efficiently flow through a bed of water-absorbing, swelling granules.

Therefore, in accordance with one embodiment of the present invention, a lightly crosslinked polymer reaction product is prepared to take advantage of the excellent handling properties of the lightly crosslinked polymer. The lightly crosslinked polymer then is further crosslinked using a latent crosslinking agent to crosslink polymer chains through pendant acid or amino groups present on the polymer chains. After latent crosslinking occurs, the resulting polymer has sufficient crosslinks to provide granules that do not absorb large quantities of aqueous fluids and that do not swell appreciably. The granules, therefore, can be used in ion exchange applications.

The latent crosslinking agent can be added to the monomer mixture prior to the polymerization reaction. During polymerization, the reaction conditions are such that the latent crosslinking agent does not react to an appreciable degree with the pendant acid or amino groups on the polymer. After polymerization, the resulting polymer typically is a hydrogel comprising the polymer and solvent, typically water, and, if present, the latent crosslinking agent. Then, during a subsequent heating or drying step to remove the solvent from the hydrogel, and form ion exchange granules, the latent crosslinking agent reacts with pendant groups on the polymer chain to further crosslink the polymer. Alternatively, the latent crosslinking agent can be added to the polymer hydrogel after polymerization to provide additional polymer crosslinks in a subsequent heating step.

The latent crosslinking agent is added to the monomer mixture, or to the polymer hydrogel, in an amount of 0 to about 6, preferably about 0.1 to about 5, mole %, based on the total number of moles of the monomers present in the monomer mixture. To achieve the full advantage of the present invention, the latent crosslinking agent is present in an amount of about 0.2 to about 5 mole %, based on the total number of moles of the monomers present in the monomer mixture.

The latent crosslinking agent can be any compound having two functional groups capable of reacting with pendant acid or amino groups on the polymer. Additional latent crosslinking agents are compounds having at least one polymerizable double bond and at least one functional group reactive with acid or amino groups. Such compounds are incorporated into the polymer chain during the polymerization reaction, and in subsequent processing steps form latent crosslinks. Another class of latent crosslinking agents are polyvalent metal ions capable of forming ionic crosslinks with acid groups.

The latent crosslinking agent typically is a water-soluble compound, and is present in the polymer hydrogel, added either prior to or after polymerization, either neat or as a water and/or alcohol solution. Then, when heating the polymer hydrogel at a temperature of about 50° C. to about 200° C., and preferably about 75° C. to about 190° C., for a sufficient time to dry and cure the hydrogel, the latent crosslinking agent reacts with pendant groups on the lightly crosslinked polymer to form additional crosslinks between polymer chains. To achieve the full advantage of the present invention, the polymer hydrogel is dried in the presence of a latent crosslinking agent at a temperature of about 90° C. to about 185° C. The polymer hydrogel is heated for about 30 minutes to about 4 hours, and preferably about 30 minutes to about 3 hours. To achieve the full advantage of the present invention, the polymer hydrogel is heated for about 30 minutes to about 150 minutes to form latent crosslinks.

The identity of the latent crosslinking agent is not limited, as long as the latent crosslinking agent has at least one functional group capable of reacting with pendant acid or amino groups on the polymer at a temperature of about 50° C. to about 200° C. over a time period of about 30 minutes to about 4 hours. Preferably, the latent crosslinking agent is alcohol soluble or water soluble, and possesses sufficient reactivity with the polymer such that crosslinking occurs in a controlled fashion, preferably at a temperature of about 50° C. to about 200° C.

Nonlimiting examples of suitable latent crosslinking agents for the polymerized reaction product of a crosslinked acrylic acid and other α,β-unsaturated acids include:

(a) polyhydroxy compounds, such as glycols, triols, and polyols, like ethylene glycol, propylene glycol, 1,3-butylene glycol, and glycerol, for example;

(b) polyvalent metal salts;

(c) quaternary ammonium compounds;

(d) multifunctional epoxy compounds, such as ethylene glycol diglycidyl ether, for example;

(e) alkylene carbonates, such as ethylene carbonate or propylene carbonate, for example;

(f) polyaziridines, such as 2,2-bishydroxymethyl butanol tris[3-(1-aziridine propionate]), for example;

(g) a haloepoxy, such as epichlorhydrin;

(h) a polyamine, such as ethylenediamine, diethylenetriamine, 1,3-diaminopropane, 1,6-diaminohexane, triethylenetetraamine, polyethylenimine, 1,4-diaminobutane, tris(2-aminoethyl)amine, and 1,5-diaminopentane;

(i) a polyisocyanate, such as 2,4-toluene diisocyanate;

(j) a hydroxyalkylamide as disclosed in Swift et al. U.S. Pat. No. 4,076,917, incorporated herein by reference, such as bis[N,N-di(β-hydroxyethyl)] adipamide, bis[N,N-di(β-hydroxypropyl)] succinamide, bis[N,N-di(β-hydroxyethyl)] azelamide, bis[N,N-di(β-hydroxypropyl)] adipamide, and bis[N-methyl-N-(β-hydroxyethyl)] oxamide, for example. A commercially available HAA is PRIMID™ XL-552 from EMS-CHEMIE, Dornat, Switzerland, having the structure

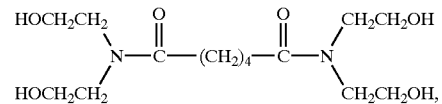

and another commercially available HAA is PRIMID™ QM-1260 having the structure

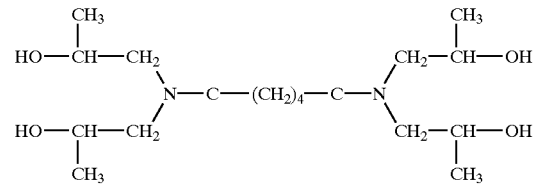

(k) hydroxyalkyl acrylates, hydroxyalkyl methacrylates, aminoalkyl acrylates, and aminoalkyl methacrylates; and (l) other crosslinking agents having at least two functional groups capable of reacting with pendant acid groups on a polymer, as known to persons skilled in the art.

Preferred latent crosslinking agents include a multifunctional epoxy compound, an alkylene carbonate, a hydroxyalkylamide, a polyhydroxy compound, a polyamine, or a mixture thereof. Especially preferred latent crosslinking agents are a glycol, ethylene glycol diglycidyl ether, propylene carbonate, propylene glycol, ethylenediamine, diethylenetriamine, and bis[N,N-di(β-hydroxypropyl)] adipamide.

Nonlimiting examples of suitable latent crosslinking agents for the polymerized reaction product of a vinyl monomer containing an amino group include multifunctional aldehydes (e.g., glutaraldehyde), halohydrins (e.g., epichlorohydrin), dihalides (e.g., dibromopropane), disulfonate esters (e.g., $ZA(O_2)O—(CH_2)_n—OS(O)_2Z$, wherein n is 1 to 10, and Z is methyl or tosyl), multifunctional epoxies (e.g., ethylene glycol diglycidyl ether), multifunctional esters (e.g., dimethyladipate), multifunctional acid halides (e.g., oxalyl chloride), multifunctional carboxylic acids (e.g., succinic acid), carboxylic acid anhydrides (e.g., succinic anhydride), organic titanates (e.g., TYZOR AA from DuPont), melamine resins (e.g., CYMEL 301, CYMEL 303, CYMEL 370, and CYMEL 373 from Cytec Industries, Wayne, N.J.), hydroxymethyl ureas (e.g., N,N'-dihydroxymethyl-4,5-dihydroxyethyleneurea), and multifunctional isocyanates (e.g., toluene diisocyanate or methylene diisocyanate). Other latent crosslinking agents are disclosed in Pinschmidt, Jr. et al. U.S. Pat. No. 5,085,787, incorporated herein by reference, and in EP 450 923.

The viscous hydrogel, containing crosslinks provided by the bulk crosslinking agent alone or by a combination of bulk and latent crosslinking agents, is dehydrated (i.e., dried) to obtain a lightly crosslinked polymerized α,β-unsaturated acid or monomer-containing amino groups in a solid form. The dehydration step can be performed by heating the viscous hydrogel in a forced-air oven to a temperature of about 40° C. to about 220° C., preferably about 120° C. to about 150° C., for a period of time, such as about 1 to about 2 hours, sufficient to form a substantially solid mass of material. Alternatively, the dehydration step can be performed by heating the viscous hydrogel overnight at a temperature of about 60° C. Other methods of dehydration (e.g., use of a dewatering solvent, or azeotropic distillation) known by persons skilled in the art also can be used.

After the dehydration step, the lightly crosslinked polymer is comminuted to form particles of the dried polymer. The polymer particles of the present invention typically are irregular granules. The irregular shape of the granules provides additional surface area, compared to spherical beads, for more efficient ion exchange.

Typically, the ion exchange resin is in the form of a granule, having a particle size of about 1 to about 10,000 microns ($\mu$m), and preferably about 20 to about 2,500 $\mu$m, in diameter. To achieve the full advantage of the present invention, the granules have a particle diameter size of about 25 to about 2,000 $\mu$m, and a median particle diameter size of about 50 to about 500 $\mu$m.

The dried solid polymer granules then can be surface crosslinked with a surface crosslinking agent. The ion exchange granules may be sufficiently internally crosslinked by the bulk and latent crosslinking agents to provide relatively nonswelling, nonabsorbent granules suitable for ion exchange purposes. By "nonswelling," it is meant that the dry granules increase in volume by no more than ten times, and preferably no more than five times after hydration. In contrast, dry SAP particles increase in volume by about 100 to about 200 times after hydration. By "nonabsorbent," it is mean that the granules absorb less than 25, and preferably less than 15, times their weight (AUNL) of tap water. In preferred embodiments, the ion exchange granules of the present invention absorb about 1 to about 10 times, and most preferably about 1 to about 5 times, their weight (AUNL) of tap water at room temperature (i.e., 25° C.).

If internal crosslinking is sufficient, surface crosslinking is not required. However, if the bulk and latent crosslinking is insufficient, or if only bulk crosslinking is utilized, the granules then are surface crosslinked to provide properties needed for an ion exchange resin.

As stated above, surface crosslinking is achieved, for example, by coating surfaces of the granules with a solution of the surface crosslinking agent, and then heating the coated granules at a sufficient temperature for a sufficient time to cure the resin and provide a dry and surface-crosslinked ion exchange resin.

In accordance with an important feature of the present invention, the polymer granules are surface crosslinked with at least about 1000 ppm, preferably at least about 5000 ppm, and more preferably about 10,000 to about 20,000 ppm of the surface crosslinking agent. The high degree of surface crosslinking ensures an ion exchange granule that is nonswelling. The ion resin granules of the present invention, therefore, can have a soft center or core, and a hard exterior that exhibits excellent mechanical integrity and stability.

Surface crosslinking is achieved by contacting a polymer granule with a solution of a surface crosslinking agent to wet predominantly only the outer surfaces of the polymer particle. Surface crosslinking and drying of the polymer particle then is performed, preferably by heating at least the wetted surfaces of the polymer particles.

Prior methods of performing surface crosslinking of polymer particles are disclosed, for example, in Obayashi U.S. Pat. No. 4,541,871, WO 92/16565, WO 93/05080, Alexander U.S. Pat. No. 4,824,901, Johnson U.S. Pat. No. 4,789,861, Makita U.S. Pat. No. 4,587,308, Tsubakimoto U.S. Pat. No. 4,734,478, Kimura et al. U.S. Pat. No. 5,164,459, DE 40 20 780, and EP 509,708. Surface crosslinking of polymer particles is discussed generally in F. L. Buchholz et al., ed., "Modern Superabsorbent Polymer Technology," Wiley-VCH, New York, N.Y., pages 97–108 (1998).

Typically, the polymer granules are surface treated with a solution of a surface crosslinking agent. The solution contains about 0.01% to about 4%, and preferably about 0.4% to about 2%, by weight, surface crosslinking agent in a suitable solvent, for example, water or an alcohol. The solution can be applied as a fine spray onto the surfaces of freely tumbling polymer granules at a ratio of about 1:0.01 to about 1:0.05 parts by weight of granules to solution of surface crosslinking agent. The surface crosslinking agent is present in an amount of 0% to about 10%, and preferably about 0.1% to about 8%, by weight of the granules. To achieve the full advantage of the present invention, the surface crosslinking agent is present in an amount of about 0.2% to about 7%, by weight of the granules.

To achieve the desired ion exchange properties, the surface crosslinking agent is distributed evenly on the surfaces of the polymer granules. For this purpose, mixing is performed in suitable mixers, e.g., fluidized bed mixers, paddle mixers, a rotating disc mixer, a ribbon mixer, a screw mixer, milling rolls, or twin-worm mixers.

The curing and drying of the surface-treated particles is achieved by heating the surface-treated polymer granules at a suitable temperature, e.g., about 25° C. to about 170° C., and preferably about 50° C. to about 165° C., and most preferably about 100° C. to about 160° C. The surface-treated polymer granules are heated for about 30 to about 180 minutes, preferably about 60 to about 150 minutes, to effect surface crosslinking. To achieve the full advantage of the present invention, the polymer granules are heated for about 75 to about 120 minutes.

Ordinary dryers or heating ovens can be used for heating the surface-treated polymer granules. Such heating apparatus includes, for example, an agitated trough dryer, a rotating dryer, a rotating disc dryer, a kneading dryer, a fluidized bed dryer, a pneumatic conveying dryer, and an infrared dryer. However, any other method of reacting the surface crosslinking agent with the polymer to achieve surface crosslinking of the granules, such as microwave energy, can be used. In the surface treating and surface crosslinking steps, the mixer can be used to perform simultaneous mixing and heating of the surface crosslinking agents and polymer granules, if the mixer is of a type that can be heated.

As previously stated, surface treating with a surface crosslinking agent, and subsequent or simultaneous heating, provides additional polymer crosslinks in the vicinity of the surface of the polymer granules. The gradation in crosslinking from the surface of the granules to interior, i.e., the anisotropy of crosslink density, can vary, both in depth and profile. Thus, for example, the depth of surface crosslinking can be shallow, with a relatively sharp transition from a high level to a low level of crosslinking. Alternatively, for example, the depth of surface crosslinking can be a significant fraction of the dimensions of the polymer granule, with a broader transition.

Therefore, as understood in the art, surface-crosslinked polymer granules have a higher level of crosslinking in the vicinity of the surface than in the interior. As used herein, "surface" describes the outer-facing boundaries of the granules. For porous polymer granules, exposed internal surfaces also are included in the definition of surface.

Depending on size, shape, porosity, as well as functional considerations, the degree and gradient of surface crosslinking can vary within a given type of polymer granules. Depending on variations in surface:volume ratio within the polymer granules (e.g., between small and large particles), it is typical for the overall level of surface crosslinking to vary over the group of polymer granules (e.g., is greater for smaller particles).

Surface crosslinking generally is performed after the final boundaries of the polymer granules are essentially established. However, it also is also possible to effect surface crosslinking concurrently with the creation of final boundaries. Furthermore, some additional changes in polymer granule boundaries can occur even after surface crosslinks are introduced. However, any other method of achieving surface crosslinking of the granules, and any other method of drying the granules, such as microwave energy, or the such, can be used.

With respect to polymeric granules comprising an α,β-unsaturated acid, suitable surface crosslinking agents are capable of reacting with acid moieties, and thereby surface crosslinking the polymer granule. Preferably, the surface crosslinking agent is alcohol soluble or water soluble, and possesses sufficient reactivity with an acid-containing resin such that crosslinking occurs in a controlled fashion, preferably at a temperature of about 25° C. to about 170° C.

Nonlimiting examples of suitable surface crosslinking agents for acid-containing resins include: (a) polyhydroxy compounds, such as glycols and glycerol; (b) metal salts; (c) quaternary ammonium compounds; (d) a multifunctional epoxy compound; (e) an alkylene carbonate, such as ethylene carbonate or propylene carbonate; (f) a polyaziridine, such as 2,2-bishydroxymethyl butanol tris[3-(1-aziridine propionate)]; (g) a haloepoxy, such as epichlorohydrin; (h) a polyamine, such as ethylenediamine; (i) polyisocyanate, such as 2,4-toluene diisocyanate; (j) hydroxyalkylamides as disclosed in U.S. Pat. No. 4,076,917, incorporated herein by reference, such as PRIMID™ XL-552, available from EMS-CHEMIE AG, Dornat, Switzerland; and (k) other crosslinking agents for acid-containing resins known to persons skilled in the art.

Preferred surface crosslinking agents include a multifunctional epoxy compound, like ethylene glycol diglycidyl ethers; an alkylene carbonate; or a hydroxyalkylamine (HAA). HAAs are disclosed in Swift et al. U.S. Pat. No. 4,076,917, incorporated herein by reference. An HAA useful in the present invention as a surface crosslinking agent, and/or a latent crosslinking agent, has the following formula:

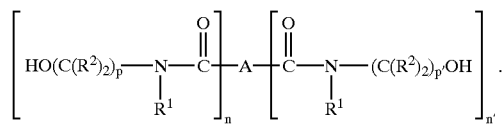

wherein A is a bond, hydrogen, or a monovalent polyvalent organic radical selected from the group consisting of a saturated or unsaturated alkyl radical contain 1 to 60 carbon atoms, such as methyl, ethyl, propyl, butyl, pentyl, hexyl, heptyl, octyl, nonyl, decyl, eicosyl, triacontyl, tetracontyl, pentacontyl, hexylcontyl, and the like, aryl, for example, mono- and dicyclic aryl, such as phenyl, naphthyl, and the like, tri-$C_{1-4}$ alkyleneamine, such as trimethyleneamino, triethyleneamino, and the like, and an unsaturated radical containing one or more ethylenic groups [>C=C<], such as ethenyl, 1-methylethenyl, 3-butenyl-1,3-diyl, 2-propenyl-1, 2-diyl, carboxy $C_{1-4}$ alkenyl, such as 3-carboxy-2-propenyl, and the like, $C_{1-4}$ alkoxy carbonyl lower alkenyl, such as 3-methoxycarbonyl-2-propenyl, and the like; $R^1$, selected independently, are hydrogen, straight or branched chain $C_{1-5}$ alkyl, such as methyl, ethyl, n-propyl, n-butyl, sec-butyl, tert-butyl, pentyl, and the like, or straight or branched chain $C_{1-5}$ hydroxyalkyl, such as hydroxyethyl, 3-hydroxypropyl, 2-hydroxypropyl, 4-hydroxybutyl, 3-hydroxybutyl, 2-hydroxy-2-methylpropyl, 5-hydroxypentyl, 4-hydroxypentyl, 3-hydroxypentyl, 2-hydroxypentyl, and the isomers of pentyl; $R^2$, selected independently, are radicals selected from the group consisting of hydrogen and straight or branched $C_{1-5}$ alkyl, or the $R^2$ radicals can be joined to form, together with the carbon atoms, a cycloalkyl ring, such as cyclopentyl, cyclohexyl, and the like; p and p', independently, are an integer 1 to 4; n is an integer having a value of 1 or 2, and n' is an integer having a value of 0 to 2, or when n' is 0, a polymer or copolymer (i.e., n has a value greater than 1, preferably 2–10) formed from the β-hydroxyalkylamide when A is an unsaturated radical.

Preferred HAAs are wherein $R^1$ is H or $C_{1-5}$hydroxyalkyl, n and n' are each 1, -A— is —$(CH_2)_m$—, m is 0–8, preferably 2–8, each $R^2$ on the α-carbon is H, and one of the $R^2$ radicals on the beta carbon in each case is H and the other is H or a $C_{1-5}$ alkyl, and q and q', independently, are an integer 1 to 3; that is,

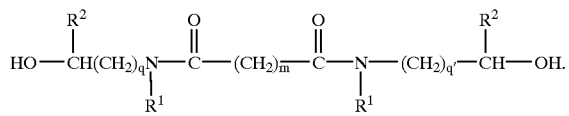

Most preferred HAAs have the formula:

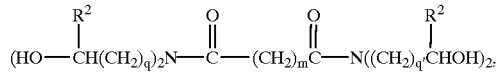

wherein both $R^2$ groups are H or both $R^2$ groups are —$CH_3$.

Specific examples of HAA compounds include, but are not limited to, bis[N,N-di(β-hydroxyethyl)] adipamide, bis[N,N-di(β-hydroxypropyl)] succinamide, bis[N,N-di(β-hydroxyethyl)] azelamide, bis[N-N-di(β-hydroxypropyl)] adipamide, and bis[N-methyl-N-(β-hydroxyethyl)] oxamide. A commercially available β-HAA is PRIMID™ XL-552 from EMS-CHEMIE, Dornat, Switzerland. PRIMID™ XL-552 has the structure

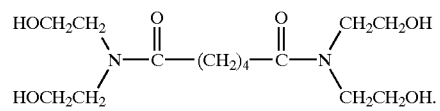

Another commercially available HAA is PRIMID™ QM-1260 from EMS-CHEMIE, having the structure:

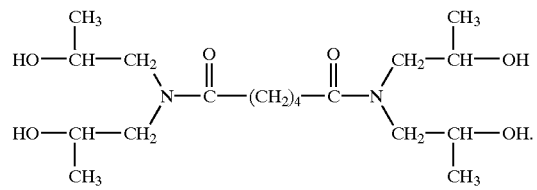

In another embodiment, the HAA has the cyclic structure

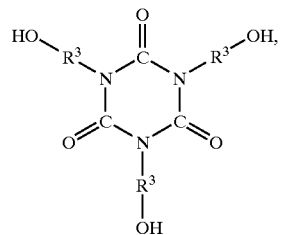

wherein $R^3$ is a divalent radical selected from the group consisting of an alkylene radical containing 1 to 4 carbon atoms and arylene. In preferred embodiments, $R^3$, independently, is $(CH_2)_2$, $(CH_2)_3$, or

With respect to polymeric granules comprising vinyl monomers containing an amino group, suitable surface crosslinking agents include di- or polyfunctional molecules capable of reacting with amino groups and crosslinking the resin. Preferably, the surface crosslinking agent is alcohol or water soluble and possesses sufficient reactivity with a resin-containing pendant amino group such that crosslinking occurs in a controlled fashion at a temperature of about 25° C. to about 170° C.

Nonlimiting examples of suitable surface crosslinking agents for resins having pendant amino groups include:

(a) dihalides and disulfonate esters, for example, compounds of the formula $$Y-(CH_2)_p-Y,$$

wherein p is a number from 2 to 12, and Y, independently, is halo (preferably bromo), tosylate, mesylate, or other alkyl or aryl sulfonate esters;

(b) multifunctional aziridines;

(c) multifunctional aldehydes, for example, glutaraldehyde, trioxane, paraformaldehyde, terephthaldehyde, malonaldehyde, and glyoxal, and acetals and bisulfites thereof;

(d) halohydrins, such as epichlorohydrin;

(e) multifunctional epoxy compounds, for example, ethylene glycol diglycidyl ether, bisphenol A diglycidyl ether, and bisphenol F diglycidyl ether, (f) multifunctional carboxylic acids and esters, acid chlorides, and anhydrides derived therefrom, for example, di- and polycarboxylic acids containing 2 to 12 carbon atoms, and the methyl and ethyl esters, acid chlorides, and anhydrides derived therefrom, such as oxalic acid, adipic acid, succinic acid, dodecanoic acid, malonic acid, and glutaric acid, and esters, anhydrides, and acid chlorides derived therefrom;

(g) organic titanates, such as TYZOR AA, available from E.I. DuPont de Nemours, Wilmington, Del.;

(h) melamine resins, such as the CYMEL resins available from Cytec Industries, Wayne, N.J.;

(i) hydroxymethyl ureas, such as N,N'-dihydroxymethyl-4,5-dihydroxyethylene urea;

(j) multifunctional isocyanates, such as toluene diisocyanate, isophorone diisocyanate, methylene diisocyanate, xylene diisocyanate, and hexamethylene diisocyanate; and (k) hydroxyalkylamides as disclosed in U.S. Pat. No. 4,076,917, incorporated herein by reference, such as PRIMID™ XL-552 and QM-1260, available from EMS-CHEMIE AG, Dornat, Siwtzerland; and (l) other crosslinking agents for amino-containing resins known to persons skilled in the art.

In addition to, or in lieu of, surface treating, the polymer granule can be annealed to provide a hard exterior coating. It has been found that heating a carboxylic acid-containing resin for a sufficient time at a sufficient temperature above the $T_g$ (glass transition temperature) of the resin provides a sufficiently hard shell around a soft interior such that the granule does not swell excessively when contacted by an aqueous fluid.

The preferred ion exchange granules of the present invention have mobile acid or amino groups in a soft core or center of the granules. These mobile acid or amino groups are more efficient with respect to exchanging a hydrogen or sodium ion for polyvalent metal ions or other contaminants present in a waste stream, for example. Furthermore, the present granules have a high surface area for more efficient ion exchange.

A bed of the present granules, as opposed to spheres, alters stream flow, which enhances stream distribution and reduces the likelihood of stream channeling through the resin. The enhanced surface area of the present granular ion exchange resin also is useful in remediating heavily particulate-laden streams, such as fermentation broths. In contrast, conventional ion exchange resins are easily fouled by a fermentation broth, thereby reducing their ability to remove proteins from fermentation broths and agricultural by-products.

In one embodiment, the bed of granules comprises an ion exchange resin of the present invention based on an α,β-unsaturated acid. In another embodiment, the bed of granules comprises an ion exchange resin of the present invention based on a polymer comprising vinyl monomers having an amino group. In yet another embodiment, the bed of granules contains a mixture of ion exchange resins, one based on an α,β-unsaturated acid and the other based on a monomer containing an amino group, in a ratio of about 95:5 to about 5:95 by weight.

The ion exchange granules of the present invention can be used to remove contaminant ions from aqueous and solvent streams. More specifically, the granules can be used in the purification of water, including the removal and recovery of heavy and transition metals, or unwanted anions, from water. For example, the granules of the present invention are more effective at removing low levels of soluble and precipitated lead present in water than conventional ion exchange resins. The ion exchange resins also are effective in removing nitrate and sulfate ions from aqueous and solvent streams. Furthermore, the high surface crosslinking of the resin gives the granules an ability to more effectively chelate ions, thereby allowing removal of metal ions under conditions where traditional weak acid ion exchange resins were not effective. The present ion exchange granules also can be used in the removal of temporary hardness in water resulting from bicarbonate alkalinity, and in pH buffering operations.

Other uses for the present ion exchange resins include pharmaceutical separation processes, such as, for example, extraction and purification of cephalosporin or extraction of streptomycin and neomycin (antibodies) from fermentation broths; precoat filtration processes used in condensate polishing and sugar processing; debittering of juices and wines; exchange media in chromatographic separations; as carriers for the delayed release of drugs; and adsorption and buffering agents in topical medicines.

EXAMPLES

The following nonlimiting examples are provided to illustrate the present invention, but are not intended to limit the scope thereof. In the test results set forth in the examples, the ion exchange granules of the present invention were tested for absorption under no load (AUNL) and absorption under load at 0.28 psi (AUL (0.28 psi)). Absorption under load (AUL) is a measure of the ability of a polymer particle to absorb fluid under an applied pressure. The AUL was determined by the following method, as disclosed in U.S. Pat. No. 5,149,335, incorporated herein by reference.

Particles of an ion exchange resin (0.160 g±0.001 g) are carefully scattered onto a 140-micron, water-permeable mesh attached to the base of a hollow Plexiglas cylinder with an internal diameter of 25 mm. The sample is covered with a 100 g cover plate and the cylinder assembly weighed. This gives an applied pressure of 20 g/cm$^2$ (0.28 psi). The screened base of the cylinder is placed in a 100 mm petri dish containing 25 milliliters of a test solution (usually 0.9% saline), and the polymer is allowed to absorb for 1 hour (or 3 hours). By reweighing the cylinder assembly, the AUL (at a given pressure) is calculated by dividing the weight of liquid absorbed by the dry weight of polymer before liquid contact.

The ion exchange resins also were tested for weight percent of extractable materials. In this test, the ion exchange resin (0.400 g) was weighed into a 150 ml beaker containing a stir bar. Then 75 ml of 0.9 wt. % aqueous NaCl was added to the beaker. The resulting mixture was stirred at 300 rpm for 16 hours. The sample then was filtered, and 40 ml of the filtrate was titrated with 0.1 M HCl to a pH of 2.7. The volume of acid required to attain pH 2.7 was correlated to the amount of soluble polymer extracted from the ion exchange resin.

The ion exchange resins were tested for ion exchange capacity (as meq of titratable acid groups per gram of resin) by the following method. A 0.5 gram sample of the ion exchange resin in the hydrogen form was stirred in 15 g of 1 M sodium hydroxide (NaOH) for three hours at 150 rpm. The sample then was filtered, and 20 ml of deionized (DI) water was added to the filtrate. The filtrate was titrated with 0.5 N hydrochloric acid (HCl) to determine the amount of NaOH consumed by the resin, which then is correlated to the ion exchange capacity of the resin.

The diameter of the hydrated ion exchange granules were measured using a Coulter LS230 particle size analyzer. The measurements were made in deionized water.

The following examples illustrate the improved ion exchange resins of the present invention. The present ion exchange resin demonstrates (a) an increased mechanical strength with respect to the processing and end use conditions experienced by ion exchange resins, (b) resistance to hydrolysis by acids and bases that are used to treat the resin before use and to regenerate the resin, and (c) an equivalent or improved ability to remove high pH lead, hardness, and alkalinity from aqueous streams than current commercial ion exchange resins.

Example 1

A monomer mixture containing about 25 wt. % acrylic acid, about 75 wt. % deionized (DI) water, 0.07 mole methylenebisacrylamide (MBA) per mole of acrylic acid, and 0.06 mole sodium persulfate per mole of acrylic acid was prepared and cooled to a temperature of about 10° C. The resulting monomer mixture then was polymerized under ultraviolet (UV) light. The polymerization was initiated using about 0.017 mole DAROCUR 1173 per mole of acrylic acid. The resulting polymer hydrogel was extruded, then dried in a forced-air oven at 60° C. overnight or at 120° C. to 150° C. for about 1 to 2 hours. The dried polymer then was ground and sized through sieves to obtain granules of a desired particle size (e.g., about 170 to about 800 microns). The resulting granules were coated with a surface crosslinker solution containing about 1.5% DENECOL EX-810, i.e., ethylene glycol diglycidyl ether or EGDGE, in a 37.5% propylene glycol and 62.5% DI water solution. The surface-treated granules were cured at about 145° C. and 180° C., which resulted in an unneutralized weak acid ion exchange resin surface crosslinked with 5000 parts per million (ppm) of EDGDE.

The ion exchange resin of Example 1 exhibited an AUL (absorbency under a load of about 0.28 pounds per square inch) of about 9 grams of water absorbed per gram of resin (g/g), and about 21 g/g of an aqueous solution of sodium hydroxide (0.1M). Additionally, the ion exchange resin of Example 1 exhibited an AUNL (absorbency under no load) of about 8.3 g/g of water and about 33.9 g/g of an aqueous solution of sodium hydroxide (0.1M).

Example 2

A monomer mixture containing about 25 wt. % acrylic acid, about 75 wt. % deionized water, and 0.07 mole trimethylolpropane triacrylate (TMPTA) per mole of acrylic acid, and 0.06 mole per mole of sodium persulfate was prepared and cooled to a temperature of about 10° C. The resulting monomer mixture then was polymerized under UV light. The polymerization was initiated using 0.017 mole DAROCURE 1173 per mole of acrylic acid. The resulting polymer hydrogel was extruded, and during extrusion, 3 wt. % of a latent crosslinking agent, i.e., glycerol, was added to the hydrogel. The extrudate was dried in a forced-air oven at about 120° C. to about 150° C. for about 1 to 2 hours. The dried polymer then was ground and sized through sieves to obtain a desired particle size (e.g., about 180 to about 710 micrometers). After drying and sizing, the resulting granules were coated with a glycerol solution (25 wt. %, glycerol, 60 wt. % propylene glycol, and 15 wt. % water). The surface crosslinked granules were cured at 180° C. for 1 hour resulting in an unneutralized weak acid ion exchange resin surface crosslinked with 10,000 ppm of glycerol.

The ion exchange resin particles of Example 2 exhibited an AUL of about 6.2 to about 6.9 g/g of water, which is less than the 8.9 g/g of water exhibited by a resin lacking surface crosslinks. Additionally, the resin of Example 2 exhibited an AUL of about 6.4 to about 6.7 g/g in a 0.1 M NaOH solution. Furthermore, the resin of Example 2 exhibited an AUNL of about 4.5 to about 5 g/g of water, which is less than the 8.4 g/g of water exhibited by a resin lacking surface crosslinks. The washed resin had a dry ion exchange capacity of about 13.1 milliequivalents per gram of resin (meq/g).

Example 3

Monomer mixtures containing about 25 wt. % acrylic acid, about 75 wt. % deionized water, 0.06 mole sodium persulfate per mole of acrylic acid, and varying amounts of a bulk crosslinker (TMPTA) were prepared and cooled to a temperature of about 10° C. The bulk crosslinker was present in the mixtures at 0.09, 0.11, 0.13, 0.16, 0.25, or 0.5 mole TMPTA per mole acrylic acid. The resulting monomer mixtures then were polymerized under UV light for about 10 minutes. The polymerizations were initiated using about 0.017 mole DAROCUR 1173 per mole of acrylic acid. The resulting polymer hydrogels were extruded, and the extrudates were dried in a forced-air oven at about 120° C. to about 150° C. for about 1 to 2 hours. The dried polymers then were ground and sized through sieves to obtain a desired particle size. After drying and sizing, the particles were coated and surface crosslinked. For some of the samples, surface crosslinking was achieved by coating with either 10,000, 15,000, or 20,000 ppm of a glycerol solution (25 wt. % glycerol, 60 wt. % propylene glycol, and 15 wt. % water), then curing the coated granules to provide an unneutralized weak acid ion exchange resin. Other samples were coated with 1.5 wt. % of DENECOL EX-810 in an 80 wt. % propylene glycol/20 wt. % water solution to give either a 400, 800, 1500, 2500, or 5000 ppm level of surface crosslinking based on the weight of the sample.

The ion exchange resins of Example 3 exhibited an AUL (0.28) of about 9 to about 11.5 g/g of water, and an AUL (0.28) of about 6 to about 10.8 g/g of an aqueous solution of sodium hydroxide (0.1M). Additionally, the resins of Example 3 exhibited an AUNL of about 9.2 to about 16.5 g/g of water, and an AUNL of about 6 to about 60 g/g of an aqueous 0.1 N solution of sodium hydroxide. The washed resins had a dry ion exchange capacity of about 10 to about 12 meq/g. The resins exhibited about 2.2 to about 6 percent by weight extractables.

Example 4

A resin was prepared according to the procedure generally described in Example 3, with the exception that about 1 to about 3 wt. %. of glycerol was added as a latent crosslinking agent to the extrudate. These resins exhibited AUL (0.28) values ranging from 5.3 to 6.3 g/g in tap water.

Example 5

A resin was prepared according to the procedure generally described in Example 2, with the exception that about 2 wt. % of calcium chloride was added as the latent crosslinking agent to the monomer mixture prior to initiation of polymerization.

Example 6

A resin was prepared according to the procedure generally described in Example 2, with the exception that about 1 wt. % of glycerol and 2 wt. % of glycerol were added as a latent crosslinking agent to the monomer mixture prior to initiation of polymerization.

The ion exchange resin of Example 6 exhibited an AUL (0.28) of about 7.1 g/g of water, and an AUL (0.28) of about 8.3 g/g of an aqueous solution of sodium hydroxide (0.1M). Additionally, the exchange resin of Example 6 exhibited an AUNL of about 7.9 g/g of water, and an AUNL of about 6.4 g/g of the sodium hydroxide solution (0.1 M).

Example 7

An acrylic acid monomer mixture containing about 57 wt. % to about 58 wt. % neutralized acrylic acid (DN=50 to 75 neutralized with either sodium hydroxide or potassium carbonate), about 43 wt. % to about 45 wt. % DI water, and 0.07 mole trimethylolpropane triacrylate (TMPTA) per mole of acrylic acid was prepared. A reaction modifier (i.e., ion exchange resin fines of a similar chemical makeup) was added to the monomer mixture in an amount of about 12 wt. %, based on the weight of the monomer mixture, and about 3 wt. % propylene glycol also was added to the monomer mixture. The resulting monomer mixture then was heated to between 50° C. and 60° C. The polymerization was initiated using about 0.034 mole of 2-2'-azobis(aminidinopropane) dihydrochloride (V-50) per mole of acrylic acid in conjunction with adding a few drops of an aqueous redox couple containing 33% by weight sodium persulfate and 33% by weight sodium metabisulfite to one corner of the bed of the heated monomer mixture. The resulting polymer slab was dried overnight at about 60° C. The dried polymer then was ground and sized through sieves to obtain a desired granule size (e.g., about 180 to about 710 micrometers). After drying and sizing, the granules were coated with propylene glycol and cured. The hydrated ion exchange resin granules of Example 7 were treated with a sufficient quantity of aqueous sulfuric acid or hydrochloric acid to yield resin granules completely converted to the hydrogen form.

Example 8

Resins were prepared according to the procedure generally described in Example 7, with the exception that the monomer mixture was unneutralized and had an elevated solids content of about 70 to about 95 wt. % acrylic acid, and typically about 92 to about 95 wt. % acrylic acid.

Example 9

Resins were prepared according to the procedure generally described in Example 8, with the exception that triallyl pentaerythritol ether (TAPE) was added as the bulk crosslinking agent to the monomer mixture prior to initiation of polymerization. TAPE was present in an amount of about 0.07, 0.1, 0.2, 0.5, or 1 mole per mole of acrylic acid. Additionally, a latent crosslinking agent was added to the monomer mixture in an amount of 3 wt. % propylene glycol and 3 wt. % glycerol. After drying, milling, and sizing, the formed polymer was coated with an aqueous glycerol solution (62.5 wt. % water and 37.5 wt. % propylene glycol), then heated (185° C. for 1.5 hours) to provide surface crosslinking in an amount of about 20,000 ppm. The ion exchange resins of Example 9 then were treated with a strong acid to fully convert the resins to the hydrated form. The resins of Example 9 exhibited an AUNL of 4.15 to about 6.04 g/g of an aqueous solution of sodium hydroxide (0.1M), and a dry ion exchange capacity of about 11.3 to about 11.7 meq/g.

Example 10

A resin was prepared according to the procedure generally described in Example 2, with the exception that 0.1 mole of divinylbenzene per mole of acrylic acid was substituted for the MBA, and no latent crosslinking agent was used. The resulting polymer hydrogel was extruded, and the extrudate was dried in a forced-air oven at about 120° C. to about 150° C. for about 1 to 2 hours. The dried polymer then was ground and sized through sieves to obtain a desired particle size. After drying and sizing, the particles were surface coated with 10,000 ppm glycerol (using a 25 wt. % glycerol, 60 wt. % propylene glycol, and 15 wt. % water solution. The treated polymer was cured resulting in an unneutralized weak acid ion exchange resin surface crosslinked with 10,000 ppm of glycerol.

The ion exchange resin of Example 10 exhibited an AUL (0.28 psi) of about 7 g/g of water. The ion exchange resin exhibited an AUNL of about 22.8 g/g of water. Additionally, the ion exchange resin of Example 10 exhibited an AUNL of about 25.7 g/g of sodium hydroxide solution (0.1M).

Example 11

An acrylic acid monomer mixture containing about 32 wt. % acrylic acid, about 68 wt. % deionized water, and 0.07 mole TMPTA per mole of acrylic acid was prepared and cooled to a temperature of about 10° C. The polymerization was initiated using about 0.1 mole of a combination of ascorbic acid/hydrogen peroxide and ferric ammonium sulfate per mole of acrylic acid. The resulting polymer hydrogel was extruded, and during extrusion, 3 wt. % glycerol, based on the weight of the polymer, as a latent crosslinking agent, was added to the hydrogel. The resulting extrudate was dried in a forced-air oven at about 180° C. for about 1 hour to about 2 hours. The dried polymer then was ground and sized through sieves to obtain a desired particle size. After drying and sizing, the particles were surface treated with an aqueous glycerol solution (25 wt. % glycerol, 60 wt. % propylene glycol, and 15 wt. % water). The surface treated polymer was cured at 185° C. for one hour, resulting in a surface crosslinked (10,000 ppm), unneutralized weak acid ion exchange resin. Some of the resins then were treated with sodium metabisulfite during extrusion.

The ion exchange resin of Example 11 exhibited an AUL (0.28) of about 6.9 to about 8.7 g/g of an aqueous solution of sodium hydroxide (0.1M), and an AUNL of about 5.5 to about 8.9 g/g of the sodium hydroxide solution (0.1M).

The weak acid ion exchange resins of Examples 1–11 were tested for an ability to remove metal ions from solution. The exchange resins of the examples exhibited the following properties:

| Moisture retention, Hydrated, H+ form | 41.5 to 70.4% |
|---|---|
| Ion Exchange Capacity, Hydrated, H+ form | 12.35 to 12.91 meq/g |
| Particle Size Hydrated (%) | |
| +14 mesh | <0.01 |
| −14 to 16 mesh | 0.57 to 1.00 |
| −16 to 20 mesh | 24.4 to 34.55 |
| −20 to 30 mesh | 42.7 to 44.1 |
| −30 to 40 mesh | 13.7 to 21.5 |
| −40 to 45 mesh | 2.49 to 5.63 |
| −45 to 50 mesh | 0.96 to 2.78 |
| −50 to 60 mesh | 0.59 to 1.88 |
| −60 mesh | 1.07 to 2.58 |
| Mean Size | 817–973 microns |

European Protocol for TOC (Washed resin) <1 ppm
(Official Journal of the European Communities Resolution AP(87)2)
(TOC is total organic carbon)

The resins were tested for an ability to remove metal ions. The testing protocol was NSF 53, and the present ion exchange resins were compared to present-day, commercially available resins, i.e., Rohm and Haas IRC 76 and IMAC resins, both of which are based on acrylic acid.

With respect to removing 50 ppm lead and 50 ppm copper from an aqueous solution, the present ion exchange resin granules performed equally or slightly better than the commercially available resins. The present resins exhibited a greater than 20% capacity improvement over commercially available resins in removing 15 ppm high pH (pH 8.6) lead, and a greater than 40% capacity improvement versus commercially available resins in treating a mixed carbon bed with copper and lead under high pH (pH 8.6) conditions. The present ion exchange resins performed equally to commercially available resins with respect to removing 3.5 ppm low pH (pH 6.7) copper.

Example 12

A monomer mixture containing about 25 wt. % acrylic acid, about 75 wt. % DI water, 0.26 mol % triallyamine (TAA), and 0.19 mol % diethylenetriamine (DETA) was prepared, then cooled to about 10° C. An initiator (DAROCUR 1173, 0.02 mol %) was added to the cooled monomer mixture, and the resulting mixture then was photopolymerized using UV light. The resulting polymer hydrogel was extruded. The extrudate then was dried in a forced-air oven at about 155° C. for 4 hours. The dried polymer then was ground and sized through sieves to obtain granules of a desired particle size (e.g., about 180 to about 710 $\mu$m). The ion exchange granules exhibited an AUNL of about 6.5 g/g (tap water), and had a median hydrated particle size of about 901 $\mu$m.

Example 13

The same procedure was used as set forth in Example 13, except that 0.19 mol % of 1,3-diaminopropane was used as a latent crosslinking agent rather than DETA. The extruded hydrogel was dried in a forced-air oven at about 155° C. for 2 hours. The ion exchange granules of Example 13 exhibited an AUNL value of about 7.8 g/g (tap water) and had a median hydrated particle size of about 1051 $\mu$m.

Example 14

The same procedure was used as set forth in Example 13, except that 0.19 mol % of 1,6-diaminohexane was used as a latent crosslinking agent rather than DETA. The extruded hydrogel was dried in a forced-air oven at about 155° C. for 2 hours. The ion exchange granules of Example 14 exhibited an AUNL value of about 7.1 g/g (tap water), and had a median hydrated particle size of about 1179 $\mu$m.

Example 15

A monomer mixture containing about 25 wt. % acrylic acid, about 75 wt. % DI water, 0.20 mol % TAA, and 0.37 mol % tris(2-aminoethyl)amine (TREN) was prepared, then cooled to about 10° C. An initiator (DAROCUR 1173, 0.02 mol %) was added to the cooled monomer mixture, and the mixture then was photopolymerized using UV light. The resulting polymer hydrogel was extruded. The extrudate then was dried in a forced-air oven at about 155° C. for 1.5, 5, or 16 hours. The dried polymer then was ground and sized through sieves to obtain a desired particle size (e.g., about 180 to about 710 $\mu$m). The ion exchange granules exhibited an AUNL ranging from 4.9 to 5.2 g/g (tap water), and had a median hydrated particle size ranging from 801 to 980 $\mu$m.

Example 16

The same procedure was used as set forth in Example 15, except that the following concentration of ingredients and curing conditions were employed:

| TAA (mol %) | TREN (mol %) | Curing Conditions | AUNL (g/g) | Median Particle Size |
|---|---|---|---|---|
| 0.2 | 1.8 | 155° C./2 hours | 4.0 | 489 $\mu$m |
| 0.2 | 0.92 | 155° C./5 hours | 3.3 | 633 $\mu$m |
| 0.21 | 0.18 | 155° C./2 hours | 5.7 | |

Example 17

In this series of experiments, various concentrations of DETA and different curing conditions were employed, oth erwise the same general procedures as set forth in Example 15 were used.

| TAA (mol %) | DETA (mol %) | Curing Conditions | AUNL (g/g) | Median Particle Size |
|---|---|---|---|---|
| 0.26 | 3 | 185° C./2 hours | 3.3 | 663 |
| 0.26 | 2.5 | 185° C./2 hours | 3.3 | 569 |
| 0.26 | 2 | 185° C./2 hours | 3.8 | 753 |
| 0.26 | 1.5 | 185° C./2 hours | 4.1 | 634 |
| 1.76 | — | 185° C./2 hours | 5.9 | — |
| 0.26 | 1.5 | 165° C./2 hours | 4.6 | — |
| 0.26 | 1.5 | 155° C./2 hours | 4.4 | — |
| 0.26 | 1.5 | 155° C./2 hours | 3.8 | 733 |

Example 18

A monomer mixture containing about 25 wt. % acrylic acid, about 75 wt. % DI water, 0.26 mol % TAA, and 1.5 mol % DETA was prepared, then cooled to about 10° C. An initiator (DAROCUR 1173, 0.02 mol %) was added to the cooled monomer mixture, then the mixture was photopolymerized using UV light. Sodium carbonate (50 mol % based on acrylic acid) was added to the hydrogel before the hydrogel was extruded. The extrudate was dried in a forced-air oven at about 155° C. for about 4 hours. The dried polymer then was ground and sized through sieves to obtain a desired particle size of about 212 to about 710 µm. The ion exchange granules exhibited an AUNL value of 9.5 g/g (10 wt. % NaOH).

Example 19

A monomer mixture containing about 25 wt. % acrylic acid, about 75 wt. % DI water, and 0.26 mol % TAA was prepared, then cooled to about 10° C. An initiator (DAROCUR 1173, 0.02 mol %) was added to the cooled monomer mixture, then the mixture was photopolymerized using UV light. DETA was added to the extruded polymer at an appropriate concentration to give a total content of DETA in the gel of either 1.5 or 2.0 wt. %. The DETA was added as either a 1 or 10 wt. % aqueous solution. The hydrogel was passed through the extruder several times to uniformly distribute the DETA throughout the hydrogel. The extrudate then was dried in a forced-air oven at about 185° C. for 2.5 hours. The dried polymer then was ground and sized through sieves to obtain a desired particle size of about 212 to about 710 µm. The ion exchange granules exhibited an AUNL value of 6.7 to 7.3 g/g (tap water). A control sample free of DETA exhibited an AUNL value of 19 g/g.

Example 20

The same procedure was used as set forth in Example 1, except that the TAA was replaced with various concentrations of ethylene glycol-based unsaturated crosslinking agents and no amine-based latent crosslinker was used, as summarized in the table below. For some of the experiments, 3 wt. % of glycerol was added to the extrudate.

| Bulk Crosslinking Agent | Latent Crosslinking Agent | Curing Conditions | AUNL (g/g) | Median Particle Size |
|---|---|---|---|---|
| PEGDM ($M_n$ = 875) | 3 wt. % glycerol | 155° C./2 hours | 4.2 | 881 |
| PEGDM ($M_n$ = 875) | None | 155° C./2 hours | 12.4 | — |
| PEGDM ($M_n$ = 550) | 3 wt. % glycerol | 155° C./2 hours | 2.8 | — |
| PEGDM ($M_n$ = 550) | None | 155° C./2 hours | 12.7 | — |
| TEGDM | 3 wt. % glycerol | 155° C./2 hours | 2.7 | — |
| TEGDM | None | 155° C./2 hours | 10.4 | — |

PEGDM = poly(ethylene glycol)dimethacrylate; TEGDMA = tri(ethylene glycol)dimethacrylate.

Example 21

The mechanical stability of the present ion exchange resins was tested by placing 20 g of a hydrated resin in a 150 ml Pyrex beaker that contained a 1¾ inch cross-style stir bar and 20 ml of DI water. The beaker was placed on a Corning stir plate, and the stir controller was set to level 4. The samples were stirred for 16 hours. At the end of the test, a portion of the resin was removed and analyzed for particle size distribution using a Coulter LS 230 analyzer. Rohm and Haas IRC 76 resin was employed as a control for this experiment. The following table compares the initial and final median particle size for these samples.

| Sample | Initial Median Particle Size | Final Median Particle Size |
|---|---|---|
| Rohm & Haas IRC 76 | 783 µm | 708 µm |
| 0.26 mol %, 1.5 mol % DETA 185° C./2 hours | 864 µm | 883 µm |

These results illustrate that the present ion exchange resin granules do not significantly change median particle size after 16 hours of stirring, wherein the commercial ion exchange resin has a decrease in median particle size of about 10%.

Example 22

Between 7 and 10 milliliters of a hydrated ion exchange resin of the present invention was transferred to 12.5 mm ID (inner diameter) column equipped with a frit at the bottom. About six bed volumes of a 10 wt. % NaOH solution was passed through the resin over a period of about 15 minutes. DI water then was passed through the resin until the pH of the effluent was reduced to between 9 and 10. The resin was quantitatively transferred into a graduated cylinder, after which the volume of the resin was measured after tapping the cylinder on hard surface to achieve a constant volume.

| Sample | % Swelling (H to Na) |
|---|---|
| 0.26 mol % TAA, 0.8 mol % DETA, 185° C./2 hours | 271 |
| 0.26 mol % TAA, 1.5 mol % DETA, 185° C./2 hours | 177 |
| 0.26 mol % TAA, 2.0 mol % DETA, 185° C./2 hours | 147 |

Example 23

A 0.4 gram sample of each resin (i.e., Rohm & Haas IRC 76 and 0.26 mol % TAA, 0.19 mol % DETA, 185° C./2 hours) was placed into a vial, then the vial was filled with 1 M NaOH. After the initial swelling of each resin, neither sample showed any change in bed height over a period of 20 hours. The DETA-based resin was stored in the NaOH solution for over two months at room temperature with no change in bed height. The results show that the present ion exchange resins are very resistant to base-induced hydrolysis.

Example 24

An aqueous monomer solution containing 67–76% acrylic acid, 0.26 mol % TAA, and 1 mol % DETA was prepared, then heated to about 57° C. V-50 and $Na_2S_2O_8$ are added as initiators, and ion exchange resin fines (based on an ion exchange resin of a similar composition) were added to the monomer solution. The resulting monomer mixture was transferred to a polymerization container, and polymerization was initiated by adding a few drops of 33 wt. % solution of sodium persulfate and sodium metabisulfate. The resulting crosslinked polymer was dried overnight in an oven at 60° C. The dried polymer was milled and sized, then cured at 185° C. The ion exchange resins exhibited AUNL values ranging from 4.3 to 5.9 g/g in tap water, and had a median particle size of about 720 µm.

Example 25

An influent tank was charged with about 160 ppm lead at pH of about 8.7 and hardness of 144 ppm (as $CaCO_3$). This lead-containing water was passed through a mixed bed column containing a 50/50 mixture of activated granular carbon and an ion exchange resin. A resin used in this test was prepared from acrylic acid, 0.26 mol % TAA, and 1.5 mol % DETA, and cured at 185° C. for 2 hours. The control resin was Rohm and Haas IRC 76. The influent was allowed to flow through the mixed bed at a flow rate of approximately 0.5 gph (gallons per hour). Breakthrough is defined as when the effluent stream reaches 15 ppb of lead (in accordance with NSF International Standard for Drinking Water Treatment Units, Protocol 53). The DETA resin shows a significantly greater capacity for removing high pH lead than the control resin, as illustrated in the graphs of FIG. 1.

Example 26

A monomer mixture containing 49 wt. % acrylic acid, 4 mol % DETA, 0.51 mol % TAA, 2.8 mol % vinylsulfonic acid, and 0.14 mol % V-50 was prepared. The monomer mixture then was heated to 62° C. and transferred to a polymerization container. A polymerization was initiated with a few drops of 30% hydrogen peroxide and 33 wt. % sodium metabisulfite. The resulting polymer slab was dried overnight at 105° C. The dried polymer was milled and sized, then cured at 185° C. for 2 hours.

Example 27

A monomer mixture containing 60 wt. % acrylic acid, 0.26 mol % TAA, 2.5 mol % tris(2-aminoethyl)amine (TREN), and 0.14 mol % V-50 was prepared. The monomer mixture was heated to 69° C., then transferred to a polymerization container. A polymerization was initiated by adding a few drops of a 30 wt. % solution of hydrogen peroxide and a 33 wt. % metabisulfite. The resulting polymer slab was dried overnight at 105° C. The dried polymer was milled and sized, then cured at 185° C. for 2 hours. The resulting ion exchange resin had an AUNL (tap water) of 1.5 and % swelling (hydrogen to sodium form) of 126.

Example 28

A monomer mixture containing 60 wt. % acrylic acid, 0.26 mol % TAA, 3.4 mol % TREN, and 0.14 mol % V-50 was prepared. The monomer mixture was heated to 69° C., then transferred to a polymerization container. A polymerization was initiated by adding a few drops of a 30 wt. % solution of hydrogen peroxide and a 33 wt. % metabisulfite. The resulting polymer slab was dried overnight at 105° C. The dried polymer was milled and sized, then cured at 185° C. for 2 hours. The resulting ion exchange resin had an AUNL (tap water) of 1.03 and % swelling (hydrogen to sodium form) of 43.

Example 29

A monomer mixture containing 60 wt. % acrylic acid, 0.26 mol % TAA, 5 mol % DETA, and 0.14 mol % V-50 was prepared. The monomer mixture was heated to 62° C., then transferred to a polymerization container. The reaction was initiated by adding a few drops of a 30 wt. % solution of hydrogen peroxide and a 33 wt. % metabisulfite. The resulting polymer slab was dried overnight at 105° C. The dried polymer was milled and sized, then cured at 185° C. for 2 hours. Similar ion exchange resins were prepared with the same components, except that the concentration of DETA was changed to 4 and 3 mol %.

Example 30

A monomer mixture containing 60 wt. % acrylic acid, 3 mol % TAA, 3 mol % DETA, and 0.14 mol % V-50 was prepared. The monomer mixture was heated to 59° C., then transferred to a polymerization container. The reaction was initiated by adding a few drops of a 30 wt. % solution of hydrogen peroxide and a 33 wt. % metabisulfite. The resulting polymer slab was dried overnight at 105° C. The dried polymer was milled and sized, then cured at 185° C. for 2 hours. The resulting ion exchange resin had an AUNL (tap water) of 2.33.

Example 31

A monomer mixture containing 60 wt. % acrylic acid, 0.26 mol % TAA, 3 mol % 1,3-diaminopropane, and 0.14 mol % V-50 was prepared. The monomer mixture was heated to 59° C., then transferred to a polymerization container. The reaction was initiated by adding a few drops of a 30 wt. % solution of hydrogen peroxide and a 33 wt. % metabisulfite. The resulting polymer slab was dried overnight at 105° C. The dried polymer was milled and sized, then cured at 185° C. for 2 hours. The resulting ion exchange resin had an AUNL (tap water) of 2.37.

Example 32

A monomer mixture containing 60 wt. % acrylic acid, 0.26 mol % TAA, 3 mol % hexamethylenediamine, and 0.14 mol % V-50 was prepared. The monomer mixture was heated to 62° C., then transferred to a polymerization container. The reaction was initiated by adding a few drops of a 30 wt. % solution of hydrogen peroxide and a 33 wt. % metabisulfite. The resulting polymer slab was dried overnight at 105° C. The dried polymer was milled and sized, then cured at 185° C. for 3 hours. This ion exchange resin had an AUNL (tap water) of 2.64.

Example 33

A monomer containing 60 wt. % acrylic acid, 0.26 mol % TAA, 0.5 mol % polyethyleneimine (average MW about 600, Aldrich Chemical Company), and 0.14 mol % V-50 was prepared. The monomer mixture was heated to 62° C., then transferred to a polymerization container. The reaction was initiated by adding a few drops of a 30 wt. % solution of hydrogen peroxide and a 33 wt. % metabisulfite. The resulting polymer slab was dried overnight at 105° C. The dried polymer was milled and sized, then cured at 185° C. for 2 hours. The resulting ion exchange resin had an AUNL (tap water) of 1.81.

Example 34

A monomer mixture containing 60 wt. % acrylic acid, 0.26 mol % TAA, 4 mol % DETA, and 0.16 mol % V-50 was prepared. The monomer mixture was heated to 66° C., then transferred to a polymerization container. The reaction was initiated with a few drops of 30 wt. % solution of hydrogen peroxide and a 33 wt. % solution of sodium metabisulfite. The resulting polymer slab was dried overnight at 105° C. The dried polymer was milled and sized, then cured at 185° C. for 2 hours. A second polymer sample was prepared in the identical way, except 3.5 mol % of vinylsulfonic acid was added to monomer mixture before the polymerization was initiated.

The cured polymer samples then were rehydrated by soaking in DI water for several hours. The hydrated polymers were transferred to individual glass column. Both samples then were washed with five bed volumes of 5 wt. % NaOH solution, then with five bed volumes of DI water, and finally with five bed volumes of 5 wt. % sulfuric acid. The resins then were rinsed with DI water until the pH of the effluent from the column equaled the pH of the water that was used to rinse the polymers. The sample without vinylsulfonic acid required 215 bed volumes of DI water to bring the pH to that of the rinsing water, while the sample that contained vinylsulfonic acid required 8.2 bed volumes of water for the pH of the effluent to reach neutral pH.

Example 35

Figure 2:
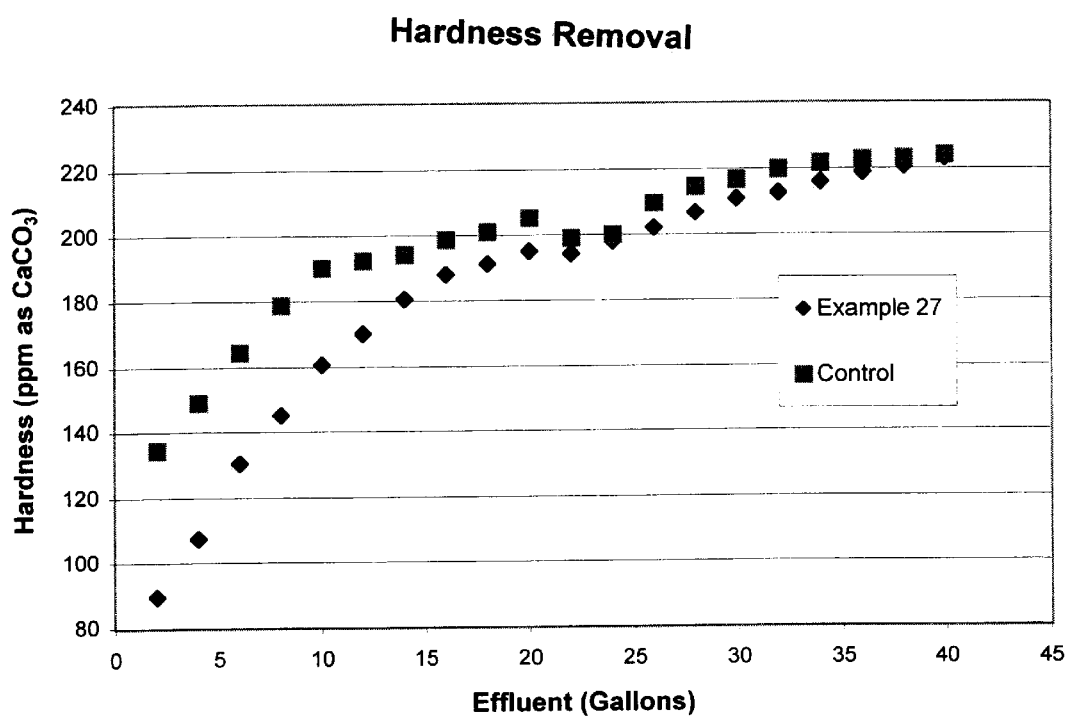
FIGS. 2 and 3 contain plots of hardness and alkalinity removal, respectively, (in ppm hardness as $CaCO_3$) vs. effluent (in gallons) comparing the hardness and alkalinity removal of an ion exchange resin of the present invention and a commercial control ion exchange resin.
Figure 3:
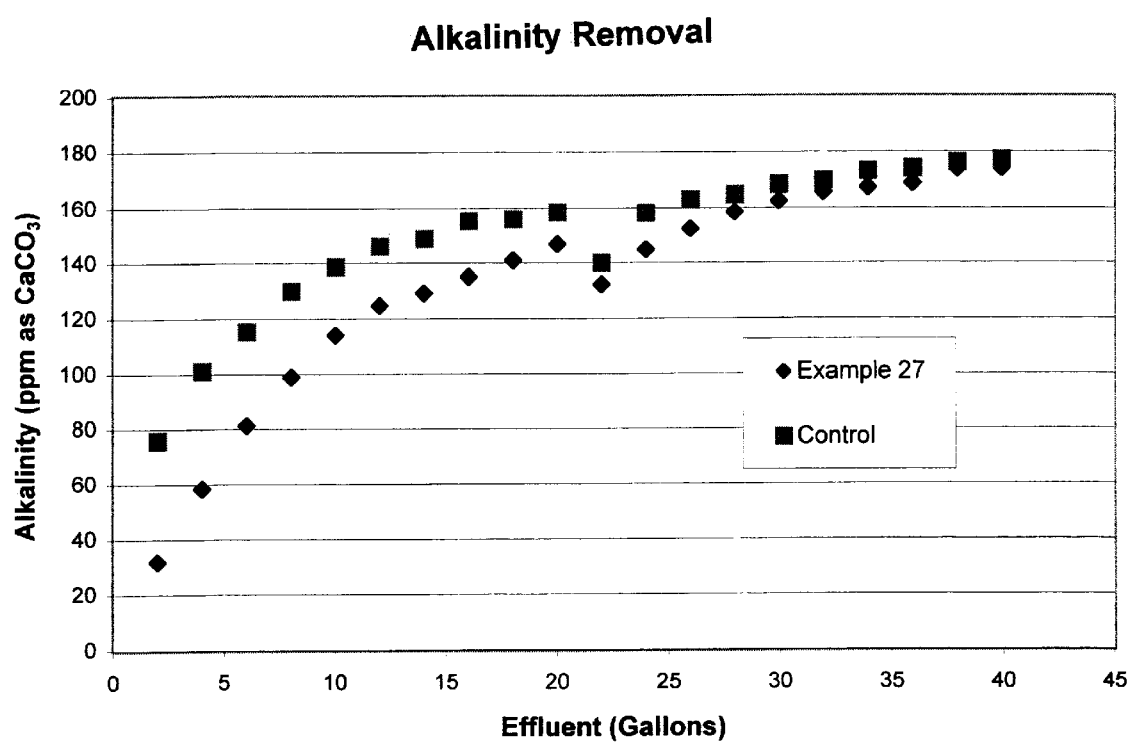

An influent tank was charged with water having about 250 ppm hardness and an alkalinity of 200 ppm. This water was passed through a mixed bed column containing a 50/50 mixture of activated granular carbon and an ion exchange resin. The resin used in this test was described in Example 27. For the control, a 50/50 mixture of Rohm and Haas IRC 76 and activated carbon mixture was used. The influent was allowed to flow through the mixed bed at a flow rate of approximately 4 gph (gallons per hour) and the alkalinity, pH, and hardness were measured every two gallons. For the first day, 20 gallons of influent were passed through the resin, the samples were allowed to rest overnight, and then for the second day, an additional 20 gallons of influent were passed through the resin/carbon mixture. FIGS. 2 and 3 show that the resin of Example 27 showed a significant enhancement in both hardness and alkalinity removal during both the first and second days of testing in comparison to the commercially available ion exchange resin.

Example 36

An axial flow water purification cartridge was constructed using 2 inch diameter polyvinylchloride tubing and suitable end caps and filters to maintain the filter media in the cartridge under line pressure. One cartridge was gravity packed with 11 ml of a powdered activated carbon (PAC, NORIT 211) and 11 ml of hydrated ion exchange resin, as described in the above Examples. In particular, the resin was prepared by a UV initiated polymerization of a 25 wt. % acrylic acid solution that contained 0.1 mol % TAPE, 3 mol % DETA, and 0.06 mol % ETMPTA. The resulting hydrogel was extruded, then cured at 185° C. for two hours. The cured resin then was milled and sized. The particles having a diameter less than 300 $\mu$m were hydrated and used in this experiment. A control cartridge that contained solely 22 ml of PAC also was prepared. The cartridges were tested on a cycle tester that ran the samples on a ten minutes on/ten minutes off cycle, and samples were tested every other cycle. The line pressure was 50 psi and the influent water contained about 102 ppm alkalinity (as $CaCO_3$), 140 ppm hardness (as $CaCO_3$), and 2 ppm chlorine.

Figure 4:
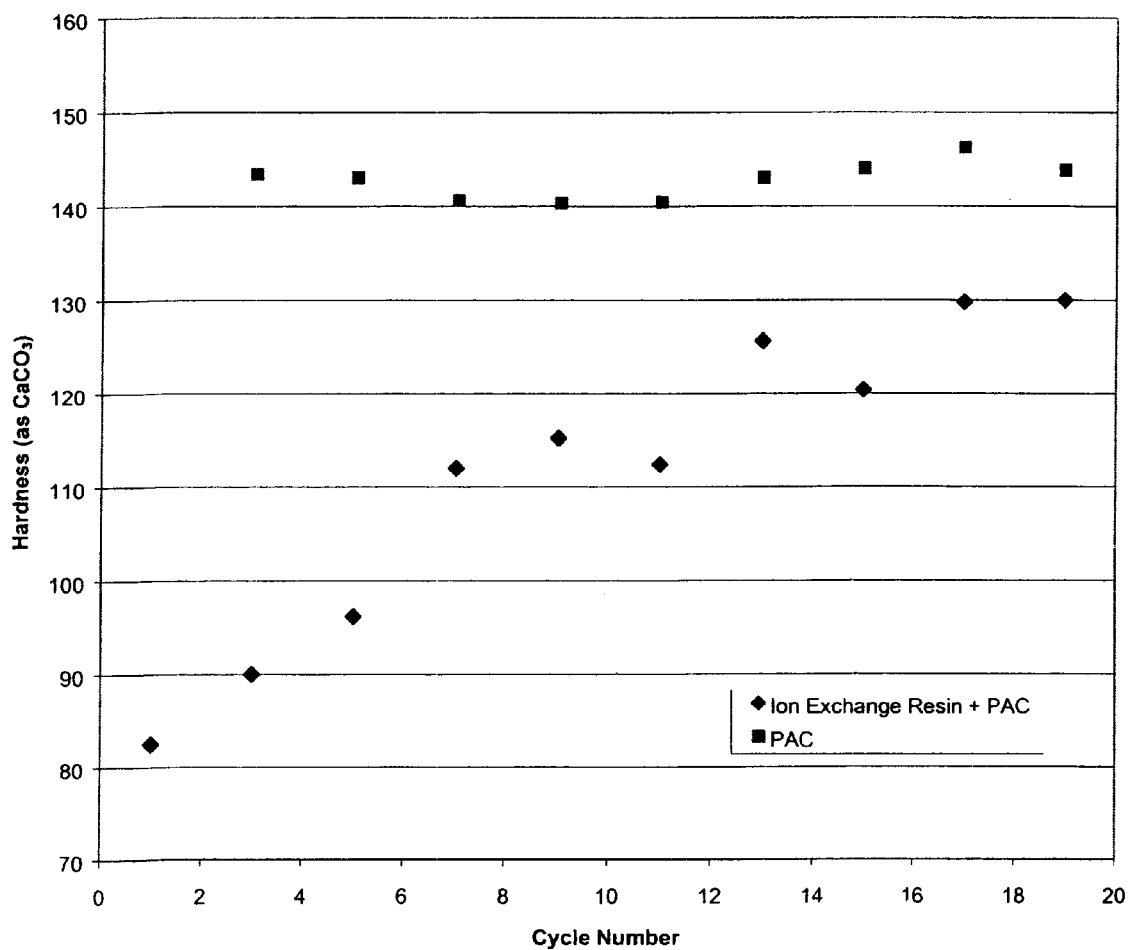
FIG. 4 is a plot of hardness (as $CaCO_3$) vs. number of cycles showing removal of hardness by an axial flow cartridge containing either powdered activated carbon (PAC) alone or a mixture of PAC and an ion exchange resin of the present invention.

FIG. 4 shows the hardness in the effluent as a function of cycle number for the control cartridge in comparison to a cartridge containing a mixture of ion exchange resin and PAC, which continues to remove hardness even after 19 cycles. FIG. 4 shows that the control cartridge containing solely PAC removes essentially no hardness.

Figure 5:
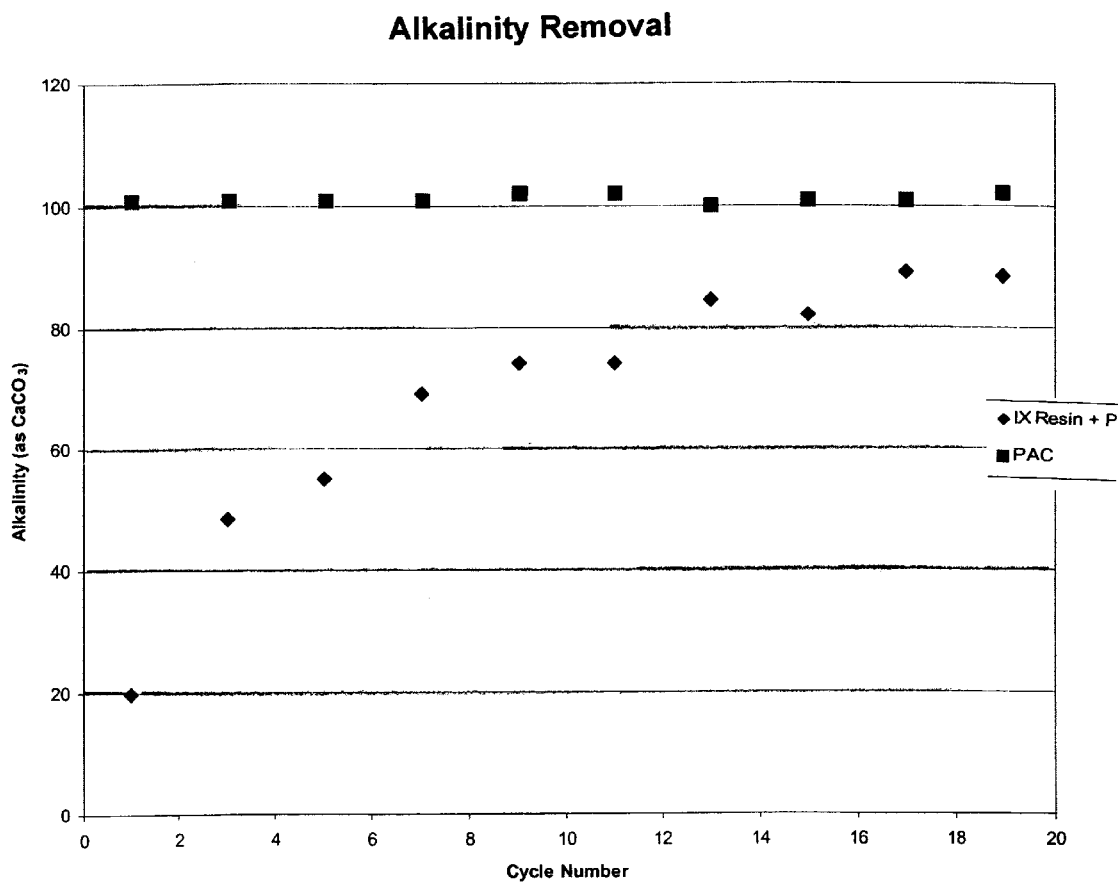
FIG. 5 is a plot of alkalinity (as $CaCO_3$) vs. number of cycles showing removal of hardness using the identical axial flow cartridges as in FIG. 4.

FIG. 5 shows the removal of alkalinity for the same set of cartridges. The cartridge of the present invention continues to remove alkalinity throughout the complete testing cycle, whereas the control cartridge containing only PAC fails to remove an appreciable amount of alkalinity. Both cartridges completely removed chlorine from the influent throughout the testing cycle.

Similar to the axial flow column of Example 36, a cartridge having a radial flow geometry also can be used to remove hardness, alkalinity, and chlorine from a water stream.

A water purification cartridge containing an ion exchange resin of the present invention can contain other adsorbents in addition to, or in place of, powdered activated carbon, for examples, a zeolite, a polystyrene adsorbent resin, or a polyacrylate adsorbent resin, such as XAD-4 and XAD-7, available from Rohm and Haas Co., Philadelphia, Pa., or mixtures thereof, or can be free of such additional adsorbents.

The foregoing description is given for clearness of understanding only, and no unnecessary limitations should be understood therefrom, as modifications within the scope of the invention can be apparent to those skilled in the art.

What is claimed is:

1. An ion exchange resin comprising a dry, granulated polymerization product of (a) an $\alpha,\beta$-unsaturated acid or salt thereof, (b) one or more optional vinyl monomers, (c) a bulk crosslinking agent in an amount of about 0.01 to bout 3 mole %, based on the total number of moles of the $\alpha,\beta$-unsaturated carboxylic acid and optional vinyl monomers, (d) a latent crosslinking agent in an amount of 0.1 to about 6 mole %, based on the total number of moles of the $\alpha,\beta$-unsaturated carboxylic acid and optional vinyl monomers, and (e) a surface crosslinking agent in an amount of 0.1 to about 2% by weight of the granules, wherein the granules have an absorbance under no load of 25 grams or less of tap water per gram of granules, and, after hydration, have a volume no more than ten times greater than a volume of the granules prior to hydration.

2. The ion exchange resin of claim 1 wherein the granules have an absorbance under no load of about 1 to about 15 grams of tap water per gram of granules.

3. The ion exchange resin of claim 1 wherein the granules have an absorbance under no load of about 1 to about 5 grams of tap water per gram of granules.

4. The ion exchange resin of claim 1 wherein a volume of hydrated granules is no more than five times greater than a volume of the granules prior to hydration.

5. The ion exchange resin of claim 1 wherein dry granules have a particle size diameter of about 1 to about 10,000 microns.

6. The ion exchange resin of claim 1 wherein dry granules have a particle size diameter of about 20 to about 2,500 microns.

7. The ion exchange resin of claim 1 wherein dry granules have a particle size diameter of about 25 to about 2,000 microns.

8. The ion exchange resin of claim 1 wherein the dry granules have a mean particle size diameter of about 50 to about 500 microns.

9. The ion exchange resin of claim 1 wherein the polymerization product contains at least 50% acid monomer units.

10. The ion exchange resin of claim 1 wherein the polymerization product contains at least 75% acid monomer units.

11. The ion exchange resin of claim 1 wherein the α,β-unsaturated acid comprises an α,β-unsaturated carboxylic acid.

12. The ion exchange resin of claim 11 wherein the α,β-unsaturated carboxylic acid is selected from the group consisting of acrylic acid, methacrylic acid, ethacrylic acid, α-chloracrylic acid, α-cyanoacrylic acid, β-methacrylic acid, 2-methyl-2-butene dicarboxylic acid, α-phenylacrylic acid, β-acryloxypropionic acid, sorbic acid, α-chlorosorbic acid, angelic acid, cinnamic acid, p-chlorocinnamic acid, β-stearylacrylic acid, itaconic acid, citraconic acid, mesaconic acid, glutaconic acid, aconitic acid, maleic acid, fumaric acid, tricarboxyethylene, maleic anhydride, fumaric anhydride, itaconic anhydride, citraconic anhydride, mesaconic anhydride, methyl itaconic anhydride, ethyl maleic anhydride, diethyl maleate, methyl maleate, salts thereof, partial salts thereof, and mixtures thereof.

13. The ion exchange resin of claim 11 wherein the α,β-unsaturated carboxylic acid has a degree of neutralization of 0% to 100%.

14. The ion exchange resin of claim 1 wherein the optional vinyl monomer is selected from the group consisting of ethylene, propylene, isobutylene, vinyl acetate, methyl vinyl ether, a styrenic compound having the formula:

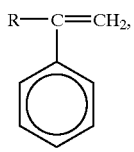

wherein R represents hydrogen or a $C_{1-6}$ alkyl group, and wherein the phenyl ring optionally is substituted with one to four $C_{1-4}$ alkyl or hydroxy groups, methyl acrylate, ethyl acrylate, isopropyl acrylate, n-propyl acrylate, n-butyl acrylate, methyl methacrylate, ethyl methacrylate, isopropyl methacrylate, n-propyl methacrylate, n-butyl methacrylate, styrene, α-methylstyrene, p-methylstyrene, t-butyl styrene, and mixtures thereof.

15. The ion exchange resin of claim 1 wherein the bulk crosslinking agent has at least two polymerizable carbon—carbon double bonds.

16. The ion exchange resin of claim 1 wherein the bulk crosslinking agent is selected from the group consisting of 1,3-butylene glycol diacrylate, 1,3-butylene glycol dimethacrylate, 1,4-butanediol dimethacrylate, 1,4-butanediol diacrylate, 1,6-hexanediol dimethacrylate, 1,6-hexanediol diacrylate, cyclopentadiene diacrylate, diallyl succinate, diallyl maleate, a diallyl ester of a polycarboxylic acid, diallyl fumarate, diethylene glycol diacrylate, diethylene glycol dimethacrylate, dipentaerythritol pentaacrylate, a divinyl ether of ethylene glycol, a divinyl ester of a polycarboxylic acid, divinyl ether divinyl adipate, divinylbenzene, ethoxylated bisphenol-A dimethacrylate, ethoxylated bisphenol-A diacrylate, ethylene glycol diacrylate, ethylene glycol dimethacrylate, ethyleneglycol digylcidyl ether, glycerol, hexamethylenebismaleimide, methylene bisacrylamide, neopentyl glycol dimethacrylate, pentaerythritol triacrylate, pentaerythritol tetraacrylate, polyethylene glycol diacrylate, polyethylene glycol dimethacrylate, triallylamine, a tetraallyl ammonium halide, tetraallyloxyethanetetraethylene glycol diacrylate, tetraethylene glycol dimethacrylate, trialkylamine, triallyl terephthalate, triallyl pentaerythritol, triethylene glycol dimethacrylate, triethylene glycol diacrylate, trimethylolpropane triacrylate, trimethylolpropane trimethacrylate, tripropylene glycol diacrylate, tris(2-hydroxyethyl) isocyanurate triacrylate, tris(2-hydroxyethyl)isocyanurate trimethacrylate, trivinyl trimellitate, and mixtures thereof.

17. The ion exchange resin of claim 1 wherein the latent crosslinking agent is selected from the group consisting of a polyhydroxy compound, a polyvalent metal salt, a quaternary ammonium compound, a multifunctional epoxy compound, an alkylene carbonate, a polyaziridine, a haloepoxy, a polyamine, a polyisocyanate, a hydroxyalkylamide, a hydroxyalkyl acrylate, an aminoalkyl acrylate, and mixtures thereof.

18. The ion exchange resin of claim 1 wherein the surface crosslinking agent is selected from the group consisting of a polyhydroxy compound, a metal salt, a quaternary ammonium compound, a multifunctional epoxy compound, an alkylene carbonate, a polyaziridine, a haloepoxide, a polyamine, a polyisocyanate, a hydroxyalkylamide, a multifunctional epoxy compound, a triol, a glycol, and mixtures thereof.

19. The ion exchange resin of claim 18 wherein the surface crosslinking agent is selected from the group consisting of propylene glycol, ethylene glycol diglycidyl ether, ethylene carbonate, propylene carbonate, ethylenediamine, diethylenetriamine, 1,3-diaminopropane, 1,6-diaminohexane, triethylenetetraamine, 1,4-diaminobutane, tris(2-aminoethyl)amine, polyethylenimine, 1,5-diaminopentane, bis[N,N-di(β-hydroxyethyl)] adipamide, bis-[N,N-di(β-hydroxypropyl)] succinamide, bis[N,N-di(β-hydroxyethyl)] azelamide, bis[N,N-di(β-hydroxypropyl)] adipamide, bis[N-methyl-N-(β-hydroxyethyl)] oxamide, and mixtures thereof.

20. The ion exchange resin of claim 1 wherein the surface crosslinking agent is present in an amount of at least about 1,000 ppm.

21. The ion exchange resin of claim 1 wherein the surface crosslinking agent is present in an amount of at least about 5,000 ppm.

22. The ion exchange resin of claim 1 wherein the surface crosslinking agent is present in an amount of about 10,000 to about 20,000 ppm.

* * * * *